United States Patent
Slocum et al.

(10) Patent No.: US 9,273,883 B2
(45) Date of Patent: Mar. 1, 2016

(54) CONCENTRATED SOLAR POWER SYSTEM

(75) Inventors: Alexander H. Slocum, Bow, NH (US);
Jacopo Buongiorno, Burlington, MA (US); Charles Winfield Forsberg, Lexington, MA (US); Daniel S. Codd, Escondido, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 126 days.

(21) Appl. No.: 12/886,039

(22) Filed: Sep. 20, 2010

(65) Prior Publication Data
US 2011/0067398 A1    Mar. 24, 2011

Related U.S. Application Data

(60) Provisional application No. 61/243,769, filed on Sep. 18, 2009, provisional application No. 61/243,763, filed on Sep. 18, 2009, provisional application No. 61/356,882, filed on Jun. 21, 2010.

(51) Int. Cl.
*F03G 6/00* (2006.01)
*F24J 2/38* (2014.01)
*F24J 2/04* (2006.01)
*F24J 2/30* (2006.01)
*F24J 2/34* (2006.01)
*F24J 2/07* (2006.01)
*F28D 20/02* (2006.01)
(Continued)

(52) U.S. Cl.
CPC *F24J 2/34* (2013.01); *F24J 2/0466* (2013.01); *F24J 2/07* (2013.01); *F24J 2/10* (2013.01); *F24J 2/32* (2013.01); *F24J 2/4609* (2013.01); *F28D 20/02* (2013.01); *Y02E 10/41* (2013.01); *Y02E 10/44* (2013.01); *Y02E 10/46* (2013.01); *Y02E 60/145* (2013.01); *Y02E 70/30* (2013.01)

(58) Field of Classification Search
CPC .......................................... F24J 2/0466–2/0472
USPC ............ 60/641.8–641.15; 126/640, 561, 567, 126/569, 600, 609, 621, 623, 634, 645, 714
See application file for complete search history.

(56) References Cited

U.S. PATENT DOCUMENTS

| 290,851 A | 12/1883 | Calver |
| 2,694,357 A | 11/1954 | Lee |

(Continued)

FOREIGN PATENT DOCUMENTS

| CN | 101105342 A | 1/2008 |
| DE | 3533565 A1 | 3/1987 |

(Continued)

OTHER PUBLICATIONS

F. White, Fluid Mechanics (McGraw-Hill, New York 1994).
(Continued)

*Primary Examiner* — Thomas Denion
*Assistant Examiner* — Mickey France
(74) *Attorney, Agent, or Firm* — Goodwin Procter LLP

(57) ABSTRACT

Systems and methods for concentrating and storing solar energy are provided. A solar energy receiver for use with the systems and methods may include a container for holding a solar absorption material, such as a phase change material, and a cooled cover disposed above the container for condensing and collecting vaporized phase change material collected along an underside of the cover.

20 Claims, 15 Drawing Sheets

(51) Int. Cl.
*F24J 2/10* (2006.01)
*F24J 2/32* (2006.01)
*F24J 2/46* (2006.01)

(56) References Cited

U.S. PATENT DOCUMENTS

| | | | |
|---|---|---|---|
| 2,800,291 A | 7/1957 | Veryan | |
| 3,892,433 A * | 7/1975 | Blake | 290/52 |
| 4,026,112 A * | 5/1977 | Scragg et al. | 60/641.8 |
| 4,034,735 A * | 7/1977 | Waldrip | 126/576 |
| 4,040,411 A * | 8/1977 | Rust | 126/602 |
| 4,202,322 A | 5/1980 | Delgado et al. | |
| 4,268,558 A * | 5/1981 | Boardman | F24C 15/34 126/400 |
| 4,390,008 A | 6/1983 | Andrews | |
| 4,401,103 A | 8/1983 | Thompson | |
| 4,408,459 A * | 10/1983 | Yogev | 60/641.8 |
| 4,408,595 A * | 10/1983 | Broyles et al. | 126/570 |
| 4,475,535 A | 10/1984 | Assaf | |
| 4,509,501 A * | 4/1985 | Hunter | 126/602 |
| 4,512,332 A * | 4/1985 | Lansing | 126/567 |
| 4,523,629 A | 6/1985 | Copeland | |
| 4,559,926 A | 12/1985 | Butler | |
| 4,643,212 A | 2/1987 | Rothrock | |
| 4,675,357 A * | 6/1987 | Welch | 524/406 |
| 5,058,837 A | 10/1991 | Wheeler | |
| 5,445,177 A * | 8/1995 | Laing et al. | 136/246 |
| 5,460,163 A * | 10/1995 | Goebel | 126/635 |
| 5,518,311 A | 5/1996 | Althaus et al. | |
| 5,598,990 A | 2/1997 | Farokhi et al. | |
| 5,685,289 A | 11/1997 | Yogev | |
| 5,887,280 A | 3/1999 | Waring | |
| 6,530,369 B1 | 3/2003 | Yogev et al. | |
| 6,959,958 B2 | 11/2005 | Basford | |
| 7,051,529 B2 * | 5/2006 | Murphy et al. | 60/641.8 |
| 7,255,387 B2 | 8/2007 | Wood | |
| 7,299,633 B2 | 11/2007 | Murphy et al. | |
| 7,458,418 B2 | 12/2008 | Sienel | |
| 7,685,820 B2 * | 3/2010 | Litwin et al. | 60/641.11 |
| 1,006,769 A1 | 3/2011 | Slocum et al. | |
| 7,900,871 B2 | 3/2011 | Rincker et al. | |
| 7,961,462 B2 | 6/2011 | Hernon | |
| 2005/0198959 A1 * | 9/2005 | Schubert | 60/641.8 |
| 2005/0258394 A1 * | 11/2005 | Bacher | C09K 5/063 252/70 |
| 2006/0260605 A1 * | 11/2006 | Connor | 126/561 |
| 2007/0012041 A1 * | 1/2007 | Goldman | 60/641.8 |
| 2007/0221208 A1 * | 9/2007 | Goldman | 126/651 |
| 2008/0000231 A1 | 1/2008 | Litwin et al. | |
| 2008/0011290 A1 * | 1/2008 | Goldman et al. | 126/655 |
| 2008/0041054 A1 * | 2/2008 | Montesinos | F03G 6/003 60/641.8 |
| 2008/0115817 A1 * | 5/2008 | Defries | 136/200 |
| 2008/0272331 A1 * | 11/2008 | Mohapatra | B01J 13/04 252/70 |
| 2008/0298967 A1 | 12/2008 | Matesanz Gil et al. | |
| 2009/0065734 A1 | 3/2009 | Yoon et al. | |
| 2010/0176249 A1 | 7/2010 | Schwetzler | |
| 2010/0236239 A1 * | 9/2010 | Kroizer et al. | 60/641.8 |
| 2011/0006165 A1 | 1/2011 | Ireland | |
| 2011/0048405 A1 | 3/2011 | Koetter et al. | |
| 2011/0142673 A1 | 6/2011 | Fang et al. | |
| 2011/0197585 A1 * | 8/2011 | De Martino et al. | 60/641.15 |
| 2012/0153628 A1 * | 6/2012 | Klinkman | F01K 27/00 290/54 |
| 2013/0047978 A1 | 2/2013 | Slocum et al. | |

FOREIGN PATENT DOCUMENTS

| | | |
|---|---|---|
| DE | 4331784 A1 | 3/1995 |
| EP | 2189736 A2 | 5/2010 |
| JP | 61287157 A | 12/1986 |
| SU | 1081389 A * | 3/1984 |
| WO | WO-2008/153922 A1 | 12/2008 |
| WO | WO 2010083285 A1 * | 7/2010 ... F24J 2/07 |
| WO | WO-2010134028 A2 | 11/2010 |
| WO | WO-2011000522 A2 | 1/2011 |
| WO | WO-2011027309 A2 | 3/2011 |
| WO | WO-2011135501 A2 | 11/2011 |

OTHER PUBLICATIONS

Moses et al., "An experimental study of laminar plumes," J. Fluid Mech., v. 251, pp. 581-601 (1993).
Pera et al., "Laminar plume interactions," J. Fluid Mech., v. 68, pt. 2, pp. 259-271 (1975).
Scase et al., "Time-dependent plumes and jets with decreasing source strengths," J. Fluid Mech., v. 563, pp. 443-461 (2006).
Yamagishi et al., "Experimental research on heat transfer enhancement for high temperature molten salt flow using nano particle layers," National heat transfer symp. of Japan 44 (May 2007).
Zinoubi et al., "Development of an Axisymmetric thermal plume between vertical plates," American J. Appl. Phys. 4(9), pp. 679-685 (2007).
Atten, Pierre et al., "Study of Dust Removal by Standing Wave Electric Curtain for Application to Solar Cells on Mars," 334-340 vol. 1, IAS 2005.
Biris, A. S. et al "Electrodynamic Removal of Contaminant Particles and Its Applications," 2004 IEEE.
Calle, C.I. et al., "Particle removal by electrostatic and dielectrophoretic forces for dust control during lunar exploration mission," Journal of Electrostatics 67 (2009) 89-92.
Corn, M. et al, "Re-entrainment of particles from a plane surface," American Industrial Hygiene Association Journal, 26(4):325-&, 1965.
Elkmann, Nobert et al., "Innovative Service Robot Systems for Facade Cleaning of Difficult-to-Access Areas," proceeding of 2002 IEEE/RSJ Intl. Conference on Intelligent Robots and Systems; Switzerland; Oct. 2002.
Figuerdo, S., "Parabolic Trough Solar Collectors: Design for Increasing Efficiency," Thesis, Massachusetts Institute of Technology (2011), sections 6.2.1 and 6.4.
Forbes, Energy recovery, 2008. http://www.forbes.com/technology/2008/05/08/mitra-energy-recovery-tech-science-cx_sm_0509mitra.html.
Gaier, James R. and Perez-Davis, Marla, "Aeolian Removal of Dust from Photovoltaic Surfaces on Mars," NASA Technical Memorandum 102507, Feb. 1990.
Gambao, E. and Hernando, M., "Control System for a Semi-automatic Façade Cleaning Robot," ISARC2006.
Greeley, Ronald et al., "Martin dust devils: Laboratory simulations of particles threshold," Journal of Geophysical Research, vol. 108, No. E5, 5041, 2003.
Hinds, William C., "Aerosol Technology: properties, behavior, and measurement of airborne particles." Wiley, New York, 2nd edition, 1999.
Hosoya, N. et al., " Wind Tunnel Tests of Parabolic Trough Solar Collectors," National Renewable Energy Laboratory—USA, Mar. 2001-Aug. 2003.
Landis, G. A., "Dust obscuration of mars solar arrays," Acta Astronautica, 38(11): 885{891, Jun. 1996.
Landis, Geoffry A., "Mars Dust-Removal Technology", J. Propulsion and Power. vol. 14, No. 1, Jan.-Feb. 1998.
Lee, Sangasan et al., "Prediction of Vortex-induced wind loading on long-span bridges", Sangasan Lee, Jae Seok Lee, Jong dae Kim, Journal of Wind Engineering and industrial Aerodynamics 67&68 (1997) 267-278.
Moreno, Luis et al., "Low Mass Dust Wiper Technology for MSL Rover"; In Proceeding of the 9th ESA Workshop on Advanced Sapace Technologies for robotics and Automation; Noordwijk, the Netherlands, Nov. 28-30, 2006.
Marticorena, B. et al., "Modeling the atmospheric dust cycle: 1. Design of a soil-derived dust emission scheme," Journal of Geophysical research, vol. 100, No. D8, pp. 16,415-16.430. Aug. 20, 1995.
Microsharp News Letter Jul. 2006, Innovators in Light Management Technology, 4 pages.
Miyake, Tohru et al., "Development of Small-Size Window Cleaning Robot by Wall Climbing Mechanism," ISARC2006.

(56) References Cited

OTHER PUBLICATIONS

Sargent & Lundy LLC Consulting Group. Assessment of parabolic trough and power tower solar technology cost and performance forecasts, 2003.
Schonfeldt, H.J. "Turbulence and Aeolian Sand Transport," 16.04.2008, EGU Vienna)—2008.
Sherman, R. et al., "Dry surface cleaning using CO2 snow," Journal of Vacuum Science & Technology B, 9(4):1970-1977, Jul.-Aug. 1991.
Sherman, R., "Carbon dioxide snow cleaning," Particulate Science and Technology, 25(1):37-57, Jan.-Feb. 2007.
Vaupell Rapid Prototyping Stereolithography resin. http://www.vaupell.com/stereolithography-sla.
Williams, Brett R. et al. "Vibration Characterization of Self-Cleaning Solar Panels with Piezocermic Actuation"; AIAA, 2007.
Zhang, Houxiang et al., "Realization of a Service Climbing Robot for Glass-wall Cleaning," Proceedings of the 2004 IEEE, International Conference on Robotics and Biomimetics, Aug. 22-26, 2004, Shenyang, China.
"Assessment of candidate molten salt coolants for the NGNP/NHI heat-transfer loop," Oak Ridge National Laboratory (Jun. 2006).
A. Rabl, 1978, Tower reflector for solar power plant, Solar Energy, vol. 18, pp. 269-271.
A. Segal, M., Epstein, 2003, Solar Ground Reformer, Solar Energy 75, pp. 479-490.
A. Yogev, A. Kribus, M. Epstein, A. Kogan, 1998, Solar "Tower Reflector" Systems: A New Approach for High-Temperature Solar Plants, J. Hydrogen Energy, vol. 23, No. 4, pp. 239-245.
Bharathan et al. (2009) "Progress in Thermal Energy Storage Modeling," Proceedings of the ASME 2009 3rd International Conference of Energy Sustainability, Jul. 19-23, 2009, San Francisco, CA. pp. 1-7.
Bohn et al. (1989) "Heat Transfer in Molten Salt Direct Absorption Receivers," Solar Energy 42(1):57-66.
Bradshaw et al., "Improved molten salt formulations for heat transfer fluids in parabolic trough solar power systems," Sandia National Laboratories, pp. 1-9 (undated).
Forsberg et al., "High-temperature liquid-fluoride-salt closed-Brayton-cycle solar power towers," 121 J. Solar Energy Engineering, pp. 141-146 (May 2007).
Hasuike et al. (2006) "Study on Design of Molten Salt Solar Receiveres for Beam-Down Solar Concentrator," Solar Energy 80:1255-1262.
Otanicar et al. (2009) "Impact of Size Scattering Mode on the Optimal Solar Absorbing Nanofluid," Proceedings of the ASME 2009 3rd International Conference of Energy Sustainability, Jul. 19-23, 2009, San Francisco, CA. pp. 1-6.
Paxson (2009) "Design and Validation of an Air Windowfor a Molten Satl Solar Thermal Receiver," Bachelor of Science thesis, Massachusetts Institute of Technology.
R. J. Copeland, J. Green, 1983, Raft Thermocline Thermal Storage, Proc. Intersociety Energy Conversion Conference, pp. 1801-1805.
R. J. Copeland, R. E. West, F. Kreith, 1984, Thermal Energy Storage at 900C, Proc. Intersociety Energy Conversion Conference, pp. 1171-1175.
Shin et al. (2009) "Investigation of Nanofluids for Solar Thermal Storage Applications," Proceedings of the ASME 2009 3rd International Conference of Energy Sustainability, Jul. 1923, 2009, San Francisco, CA. pp. 1-4.
Tamaura et al., "A novel beam-down system for solar power generation with multi-ring central reflectors and molten salt thermal storage," 13th Intl. Symp. on Concentrated Solar Power and Chemical Energy Tech., 9 pages (2006).
Trombe et al. (1973) "Thousand KW Solar Furnace, Built by the National Center of Scientific Research, in Odeillo (France)," Solar Energy 15:57-61.
Tyagi et al. (2009) "Thermochemical Conversion of Biomass Using Solar Energy: Use of Nanoparticle-Laden Molten Salt as the Working Fluid," Proceedings of the ASME 2009 3rd International Conference of Energy Sustainability, Jul. 19-23, 2009, San Francisco, CA. pp. 1-10.
W.D. Drotning, 1977, Optical Properties of a Solar-Absorbing Molten Salt Heat Transfer Fluid, SAND77-0938.
A.C. Skinrood et al., 1974, Status Report on a High Temperature Solar Energy System, SAND74-8017.
J. E. Pacheco, S. K. Showalter, and W. J. Kolb, 2002, Development of a Molten-Salt Thermocline Thermal Storage System for Parabolic Trough Plants, J. Solar Energy Engineering, 124, pp. 153-159.
M. Epstein, A. Segal and A. Yogev, 1999, A molten salt system with a ground base-integrated solar receiver storage tank, J Phys. IV France 9.
U. Herrmann, B. Kelly, and H. Price, 2004, Two-tank molten salt storage for parabolic trough solar power plants, Energy 29, pp. 883-893.
W. Stoke, 1999, Solar Two Central Receiver, California Energy Commission, Contract No. 500-97-012.
Tyagi, "Radiative and combustion properties of nanoparticle-laden liquids," Ph.D. Thesis, Arizona State University (2008).
Slocum, Alexander H. et al., "Concentrated solar power on demand," Solar Energy, ScienceDirect, 2011, pp. 1519-1529.
International Search Report and Written Opinion mailed Jan. 24, 2013 in PCT/US2012/053438.
International Search Report and Written Opinion in PCT/US2010/049474 mailed Aug. 20, 2013.
Invitation to Pay Additional Fees and Partial Search Report in PCT/US2010/049474 mailed Jun. 13, 2013.
International Preliminary Report on Patentability in PCT/US2010/049474 issued Sep. 17, 2013.
International Preliminary Report on Patentability in PCT/US2010/053438 issued Mar. 4, 2014.
Chinese Office Action issued Feb. 17, 2015 in Chinese Application No. 201080049955.6; English Translation, 13 pages.
Bahaa, Cogeneration of Electricity and Desalinated Main Drain Channel River Water Using Concentrated Solar Power, Dec. 2009, Solar Energy Conference.
Chinese Office Action issued Jun. 4, 2014 in Chinese Application No. 201080049955.6; English Translation, 6 pages.
Chinese Office Action issued Jun. 3, 2015 in Chinese Application No. 201080049955.6; English Translation, 8 pages.

* cited by examiner

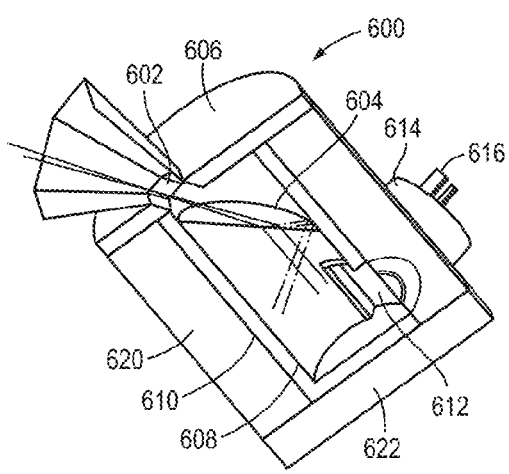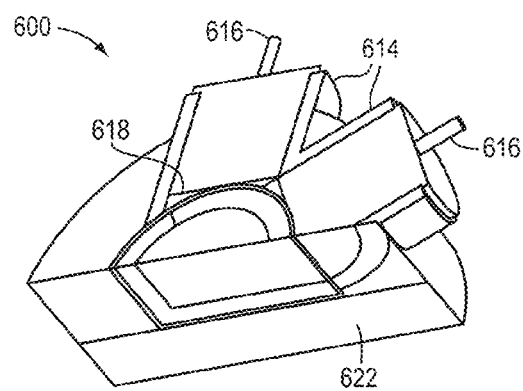
FIG. 6A
FIG. 6B

CONCENTRATED SOLAR POWER SYSTEM

CROSS-REFERENCE TO RELATED APPLICATIONS

This application claims priority to and the benefit of U.S. Provisional Application Ser. Nos. 61/243,763 and 61/243,769, both filed on Sep. 18, 2009, and U.S. Provisional Application Ser. No. 61/356,882, filed on Jun. 21, 2010. All three applications are hereby incorporated herein by reference in their entirety.

FIELD OF THE INVENTION

The present invention relates to solar power systems and methods for concentrating and storing solar energy at high temperatures in a fluid-filled receiver. The stored energy may be used to generate electricity.

BACKGROUND

Large-scale solar concentrator and storage systems currently in use typically include a field of solar reflectors that focus light onto a tower-mounted receiver structure. The receiver structure may be a direct absorption type (e.g., molten salt flowing down a vertical surface) or a tube type (e.g., with water flowing through tubes). The thermal storage medium absorbs the thermal energy and, in the case of water, turns to steam or may be used to generate steam for use in a conventional steam turbine system for generating electricity. The heated medium may be transferred to an insulated storage tank so that, when the sun does not shine, hot medium from the storage tank is available to provide heat for the power cycle.

Solar power towers have several inefficiencies that adversely affect their economics. For example, because the boiler tubes in the receiver are uninsulated and exposed to the ambient environment, such systems incur high heat losses due to air convection and radiation from hot surfaces. Further, the storage medium has to be pumped up to the elevation of the boiler, which requires significant pumping power. As a result, the overall efficiencies of solar tower systems are relatively low—about 20%. Moreover, capital costs to build the solar power towers to support the heavy receiver are high.

Some of the drawbacks of tower-mounted receivers are overcome in alternative systems, where the tower supports secondary mirrors that re-direct the solar energy into a receiver on, or preferably partially buried in, the ground. On the downside, the use of secondary mirrors further reduces the efficiency of converting solar into thermal energy. The system efficiency is further constrained by the maximum solar energy density that the secondary mirrors can withstand without damage due to overheating.

An additional constraint on the ability of solar power systems to store high energy densities is posed by the temperature range in which the storage medium is chemically stable. Molten salt compositions currently in use, such as nitrate mixtures, decompose as temperatures approach 600° C., thus limiting the maximum temperature and, accordingly, the energy storage density of the system and the efficiency of power cycles downstream of the receiver.

Accordingly, there is a need for solar power systems that facilitate efficient solar-energy conversion, high-density energy storage, and robust and continuous power supply, preferably at low capital cost.

SUMMARY

The present invention provides concentrated solar power systems and methods that simultaneously address many of the problems and limitations of the solar power systems described above. In various embodiments, the systems and methods utilize a solar energy receiver containing a (typically high-temperature) solar absorption material, such as a phase change material, that acts as a thermal storage medium, integrated with a solar concentrator system. The solar concentrator system may be formed by an array of heliostats that reflect and concentrate sunlight into the receiver. In the receiver, the solar radiation is absorbed throughout at least a portion of the volume of the absorption material, and thereby converted into thermal energy that can be readily stored, and used, for example, to generate steam for a conventional steam cycle system to generate electricity, as a source of process heat, or to preheat a working fluid in a desalination cycle.

In certain embodiments, the receiver is (at least partially) buried in the ground, which provides thermal insulation and, thus, renders the ground-based receiver a more economical thermal reservoir than a tower-mounted receiver. The heliostats may be placed at elevations above the receiver (for example, on a hillside) to act, effectively, as a faceted beam-down optic. This configuration eliminates the cost and complexity associated with a beam-down system, which typically includes a large secondary tower-based hyperbolic mirror and many primary concentrating power collectors at the base of the tower.

The receiver may include an open container for holding a phase change material "pool" or "pond," and a cover disposed above the container to limit loss of the phase change material due to vaporization and assists in retaining captured solar energy in the receiver. Containing the thermal storage medium in a tank-like container rather than in boiler tubes permits the use of container materials and constructions that can withstand higher temperatures and are, in addition, typically relatively inexpensive. The cover may include a cooling system that facilitates the condensation and retention of evaporated phase change material (typically a molten salt composition), thus minimizing loss of the material. The condensed phase change material may form a reflective layer at the underside of the cover. The structure formed by the container and/or the cover may include a single inlet aperture through which incoming solar radiation is directed. An optional air curtain across the inlet aperture may further reduce or prevent energy and phase change material losses from the receiver, as well as prevent contamination of the phase change material by air borne dust and contaminants. Alternatively, the receiver may include a door for opening and closing the inlet aperture, e.g., dependent on the intensity of the solar radiation.

In certain embodiments, the thermal storage medium is a molten salt composition that is chemically stable at temperatures exceeding 700° C. and, preferably, at temperatures up to at least 1000° C. To transfer the heat stored in the molten salt to a working fluid, a portion of the composition may be mixed with cooler molten salt to reduce the temperature of the mixture to a value sufficiently low to enable conducting it through a conventional heat exchanger to generate steam. After passing through the heat exchanger, the salt is recycled into the receiver and/or a storage cycle for the cooler molten salt. Alternatively, to achieve a higher thermodynamic efficiency, a regenerative heat exchanger may be used, in which the hot salt from the tank transfers heat to the cooler salt returning from the steam generator heat exchange cycle. In some embodiments, the salt mixture enters the heat exchanger at a temperature near or exceeding 700° C., facilitating use of a reasonably efficient direct air Brayton power cycle, which does not require water cooling.

In some embodiments, the molten salt in the receiver is pumped as needed from the top of the container to provide substantially constant power input to a steam generator or other power cycle. Cold salt from the steam generator is pumped to the bottom of the container. The container may include an insulated divider plate that provides a physical and thermal barrier between the thermally stratified hot and cold layers within the container. The divider plate may be moved axially up and down, allowing molten salt to move past the plate through an annular clearance space between the plate and the container wall, to maintain the hot and cold salt volumes in temperature ranges desirable for continuous operation (e.g., at substantially constant temperatures). As a result, high temperature steam can be provided even as the average temperature of the salt in the container decreases when the sun is not shining. Further, because the total volume of salt in the container does not change, the top surface of the salt, advantageously, remains at the focal point of the solar field.

Solar power systems in accordance with various embodiments provide energy storage that compensates for cloud cover or night-time lack of sunlight. Thus, they facilitate satisfying baseload power needs around the clock without requiring extensive combustion of fossil-fuel backup or high-cost (and as of yet unavailable) tentative battery storage. As a result, various solar power systems disclosed herein not only provide energy savings, but offer substantial avoided installed capacity for utility companies.

In one aspect, the invention provides a concentrated solar power system including a ground-based solar energy receiver, and a plurality of heliostats that are configured such that they reflect impinging solar radiation directly (i.e., without further reflections) into an interior of the receiver through a receiver aperture. The receiver is adapted to contain a solar absorption material (which may, itself, be a component of the system) for converting solar energy into heat. The solar absorption material may include or essentially consist of a phase change material, which may be semi-transparent and may, in liquid form, include a molten salt (such as, e.g., a chloride salt, fluoride salt, carbonate salt, nitrite salt or a mixture thereof). In certain embodiments, the molten salt is chloride salts, and the phase change material further comprises hydroxide for reducing generation of HCl when the molten salt comes into contact with moist air. Further, in some embodiments, the solar absorption material includes a nanoparticle blend, to modify a solar radiation absorption characteristic of the absorption material.

The heliostats may be located at an elevation above the aperture of the receiver (for example, on a hillside), and oriented so that solar radiation passing or focused through the aperture is directed primarily at a surface of the solar absorption material. The receiver may be at least partially buried in the ground. In some embodiments, the receiver includes a container and a cover disposed above the container. The heliostats may then be disposed at an elevation below the receiver, and oriented so that solar radiation passing through the aperture is directed at an underside of the cover. The ground-based receiver and heliostats together may be configured to facilitate heating of the solar absorption material to a temperature in a range of about 600° C. to at least about 1000° C.

In another aspect, the invention is directed to a solar energy conversion system including a solar energy receiver that is adapted to contain a solar absorption material for converting solar energy into thermal energy, a heat exchanger adapted to transfer thermal energy from liquefied solar absorption material to a working fluid for use in generating mechanical and/or electrical energy; and a mixing chamber adapted to mix the liquefied solar absorption material with cooler solar absorption material from an outlet of the heat exchanger, to lower a temperature of the liquefied solar absorption material prior to delivery to the heat exchanger.

This system may further include one or more thermal energy storage reservoirs in fluidic communication with the receiver and/or interjacent (and in fluidic communication with) the heat exchanger and the mixing chamber. The solar energy receiver may be adapted to contain the phase change material at a temperature in a range of about 600° C. to at least about 1000° C. In some embodiments, the system includes a turbine for converting thermal energy of the working fluid to mechanical energy, and/or a generator driven by the turbine, to convert mechanical energy to electrical energy.

The invention further provides, in another aspect, a method of generating energy using a concentrated solar power system. The method includes the steps of directing solar radiation in a single reflection through a receiver aperture into a solar energy receiver so as to concentrate solar energy in the receiver and thereby heat a solar absorption material contained in the receiver to a temperature in a range of about 600° C. to at least about 1000° C., transferring thermal energy from the heated solar absorption material to a working fluid, and generating at least one of mechanical energy and electrical energy using the working fluid.

In some embodiments, the thermal energy is transferred to the working fluid at a temperature exceeding about 700° C. The working fluid may be or include air, and the energy generation step may utilize a direct air Brayton power cycle (which, in certain embodiments, does not require water cooling). In some embodiments, the thermal energy is transferred from the heated solar absorption material to the working fluid in a heat exchanger. The method may, moreover, include a step of mixing liquefied solar absorption material from the receiver with cooler solar absorption material from an outlet of the heat exchanger so as to decrease a temperature of the liquefied solar absorption material prior to delivery to the heat exchanger.

Yet another aspect of the invention relates to a solar energy receiver. The receiver includes a container with an interior adapted to contain a solar absorption material and a cover disposed above the container. The container defines an opening along an upper portion to permit impingement of solar radiation onto the solar absorption material, and forms, in some embodiments together with the cover, an inlet aperture to permit passage of solar radiation through the aperture. The system further includes a cooling system to facilitate condensation of at least a portion of vaporized solar absorption material collected along an underside of the cover. The underside of the cover may be adapted to reflect impinging solar radiation toward the interior of the container, and may form a nonimaging concentrator. In some embodiments, the concentrator includes the underside of the cover in combination with condensed solar absorption material collected thereon. The cover may be adapted to return at least a portion of condensed solar absorption material to the interior of the container.

In some embodiments, the receiver includes at least one convection initiator cell disposed at or proximate to the bottom of the container interior. The convection initiator cell may be or include a substantially conical element. The system may also include a door, optionally insulated, for closing the inlet aperture to reduce thermal energy loss from the receiver and to prevent mass transfer through the aperture, or an air curtain across the inlet aperture to reduce thermal energy loss and to reduce mass transfer through the aperture.

In a further aspect, a method of capturing solar energy for use in power generation is provided. The method involves directing solar radiation through an inlet aperture of a receiver (the aperture being formed by a container and/or a cover disposed above the container, and the container having an exposed interior with a solar absorption material therein), cooling the cover to condense vapor rising from liquefied solar absorption material, and returning at least a portion of the condensed vapor to the interior of the container. Solidified solar absorption material deposited on an underside of the cover may be melted, e.g., as a result of solar radiation directly impinging on the solidified material and/or solar radiation reflecting off an upper surface of material in the receiver. In some embodiments, the method further includes forming an air curtain across the inlet aperture to reduce thermal energy loss and/or mass transfer, and/or inducing convection of the phase change material in the container (e.g., using one or more convection initiator cells disposed at or near a bottom of the container interior).

In yet another aspect, various embodiments are directed to a solar energy receiver including a container structure adapted to contain and substantially enclose a molten salt, and a vertically movable divider plate disposed horizontally in the container structure so as to divide the container structure into an upper portion and a lower portion. The container structure defines an inlet aperture that permits passage of solar radiation into the receiver, which may be closed by a door that is, in some embodiments, part of the receiver. The divider plate forms an annular gap space that allows flow of the molten salt between the upper and lower portions of the container. A radial dimension of the annular gap space may be selected so as to substantially prevent mechanical binding between the divider plate and the container, and/or such that relative motion of the divider plate within the container promotes salt plume expulsion and mixing opposite a direction (e.g., on the hot side) of motion of the divider plate.

The receiver may further include a vertical motion actuation system to control a vertical position of the divider plate. A controller for driving the actuation system to move the divider plate may also be included. The controller may move the divider plate so as to substantially maintain constant temperature of the salt on the hot side of the divider plate (i.e., typically, the upper portion of the container) as solar energy is added and thermal energy is extracted by pumping salt from the hot side, through a heat exchanger, and back to the cold side of the divider plate (i.e., the lower portion of the container). In other words, the controller may move the divider plate so as to substantially balance net thermal gain to the receiver with sensible heat gain of molten salt displaced from the lower portion to the upper portion, and to substantially balance net thermal extraction from the receiver with sensible heat loss of molten salt displaced from the upper portion to the lower portion. The controller may also move the divider plate such that a location of the divider plate substantially coincides with a boundary between thermally stratified hot and cold molten salt layers in the container structure.

The divider plate may be made of or include a corrosion- and creep-resistant alloy, or a ribbed steel plate. Further, it may include an insulating refractory ceramic layer. The divider plate may be substantially neutrally buoyant when the receiver is filled with molten salt. In some embodiments, the divider plate includes a hollow tubular structure. The upper surface of the divider plate may be textured, coated, and/or oxidized to enhance solar absorptivity and reduce specular reflectivity.

A further aspect is directed to a method of storing solar energy in a covered container holding molten salt, which is separated by a horizontal divider plate in an upper portion and a lower portion, wherein the divider plate leaves an annular gap space for salt flow therethrough. The method includes receiving solar energy in the container, thereby heating the molten salt in the upper portion of the container, vertically moving the divider plate so as to continuously maintain at least a minimum temperature difference between an average temperatures of the molten salt in the upper and lower portions, respectively, and extracting heat from the molten salt in the upper portion of the container.

The method may further include opening and closing a door of an inlet aperture defined by the covered container based on the intensity of solar energy passing through the aperture. Extracting heat may involve pumping hot molten salt from the upper portion of the container to a heat exchanger, and returning colder molten salt from the heat exchanger to the lower portion of the container. The total volume of molten salt in the upper and lower portions of the container may be kept substantially constant. The method may further include actively cooling the cover of the container, and heat extracted from the actively cooled cover may be used to preheat a working fluid in a power cycle and/or desalination cycle. In some embodiments, vaporized salt is condensed at the underside of the actively cooled cover.

BRIEF DESCRIPTION OF THE DRAWINGS

The foregoing will be more readily understood from the following detailed description in conjunction with the drawings, in which:

FIGS. 6A and 6B are cutaway perspective views of an inclined solar energy receiver and its intersection with heat exchangers, respectively, in accordance with some embodiments;

DETAILED DESCRIPTION

1. Solar Concentrator System Configuration

Figure 1A:
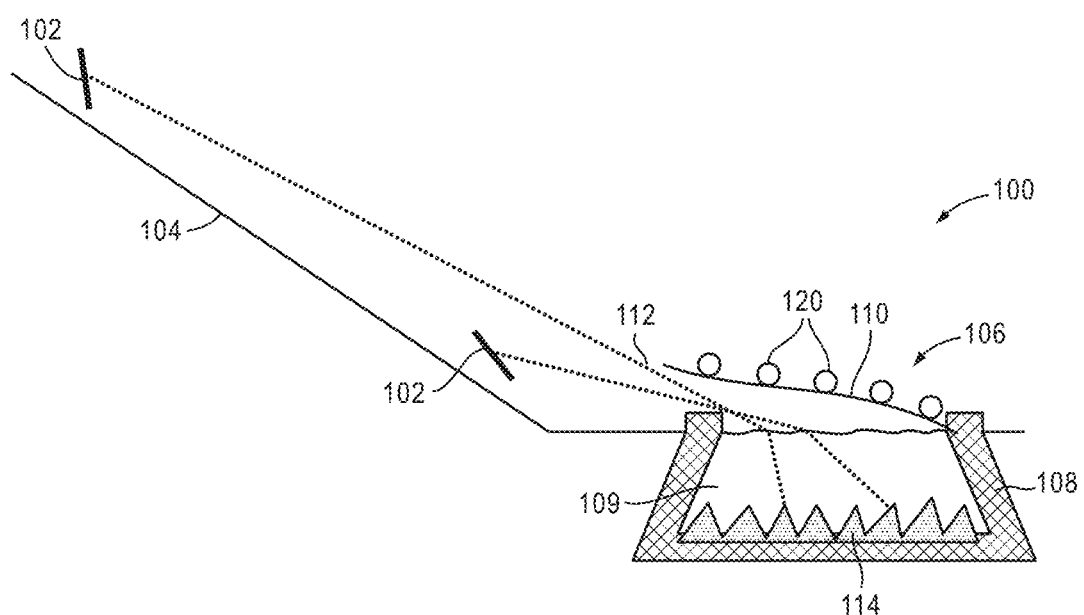
FIG. 1A is a schematic side view of a solar power system including hillside-mounted heliostats and a receiver at the base of the hill in accordance with some embodiments of the invention.

Concentrated solar power systems in accordance with various embodiments of the invention generally integrate a solar reflector field with a thermal receiver including, for example, a covered container. FIG. 1A illustrates an exemplary configuration 100 of such a system, wherein heliostats 102, i.e., solar reflectors capable of tracking the movement of the sun, are mounted on a hillside or other incline 104. The reflective surfaces of the heliostats may have parabolic shapes. In operation, the heliostats 102 are usually oriented so as to re-direct impinging sunlight directly into a receiver 106 at or near the base of the incline or hill, as shown; secondary reflectors are not needed. Under conditions of very high solar influx, some of the heliostats 102 may be misaligned or misoriented to avoid overheating of the receiver 106; however, as discussed below, the receiver 106 is designed to tolerate and operate at temperatures far exceeding those of conventional systems.

The receiver 106 includes a container 108 holding a thermal storage fluid 109, such as a molten salt composition or other phase change material. The container walls may be insulated. In some embodiments, insulation is achieved by largely burying the receiver 106 in the ground, leaving only the receiver cover 110 and an inlet aperture 112, through which solar radiation can enter, above ground, as illustrated. Solar radiation reflected off the heliostats 102 and passing through the inlet aperture 112 may be incident either directly on the surface of the thermal storage fluid or on the underside of the cover 110, depending on the angle along which it enters the receiver. Solar radiation that penetrates the storage fluid is volumetrically absorbed along its way. The captured solar energy may be distributed throughout the pond by convection, which may be facilitated by optional convection cells 114 located on the bottom of the container 108 and/or on the walls.

In some preferred embodiments, the thermal storage fluid is a high-temperature salt composition, i.e., a composition of one or more salts that do not decompose at temperatures in a range of about 700° C. to about 1000° C., or higher. Using a high-temperature storage medium allows the heliostat array to concentrate very large amounts of solar energy in the receiver, and may result in higher energy efficiency of the system. At the surface of the molten salt pond, the temperature typically reaches levels at which some of the molten salt evaporates. The evaporated salt vapor rises and deposits on the underside of the cover 110, which may be actively cooled to facilitate condensation and/or solidification. Reflected sunlight impinging on the solidified salt may advantageously re-melt it. As a result of the condensation and melting process, the salt layer formed on the cover is continuously replenished.

Figure 2:
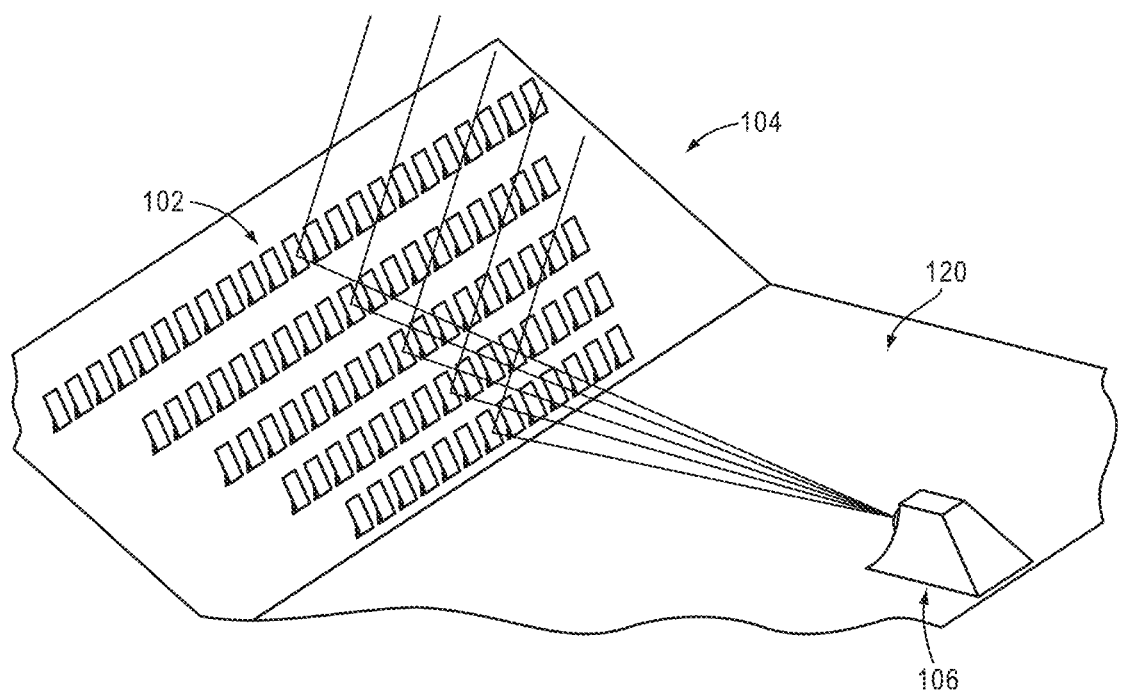
FIG. 2 is a schematic perspective view of a heliostat array in accordance with some embodiments.

FIG. 2 shows an isometric view of a system with tens of heliostats 102 mounted on a hillside 104 and directing solar radiation into a receiver 106 located at ground level 116. Typical systems may, however, include thousands of heliostats, which may be arranged in an array or in another fashion, depending on the local topography. If, as illustrated, the receiver 106 is placed on (or buried in) flat ground 116, some distance away from the hill, greater efficiency can be obtained than in configurations where the receiver is also located on the hill. In certain preferred embodiments, the distance of the receiver 106 from the base of the hill is about one-half the radius of the heliostat field. In the space between the base of the hill and the receiver, conventional photoelectric panels may be installed to make use of this available space for power generation and, thus, increase the return on land investment.

Figure 3:
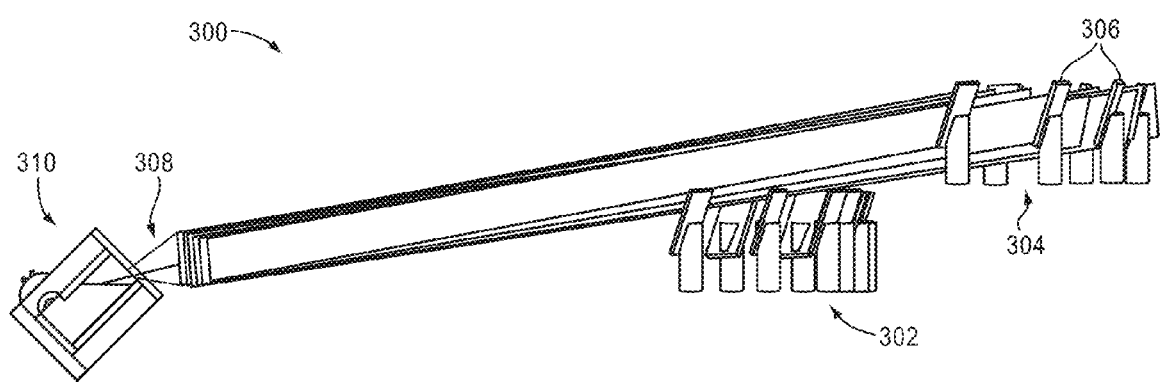
FIG. 3 is a schematic side view of a small-scale solar power system including an inclined receiver in accordance with some embodiments.

FIG. 3 shows a small-scale embodiment 300 of the invention, where a heliostat array including two rows 302, 304 beams sunlight into an inclined cylindrical receiver 310. In the illustrated example, plane mirror heliostats 306 are used in combination with a solar power collector 308. The solar power collector 308 avoids the need for a large inlet aperture, which might otherwise cause significant thermal losses. In alternative embodiments, parabolic reflector heliostats with good focus properties may be used in small-scale systems.

Figure 1B:
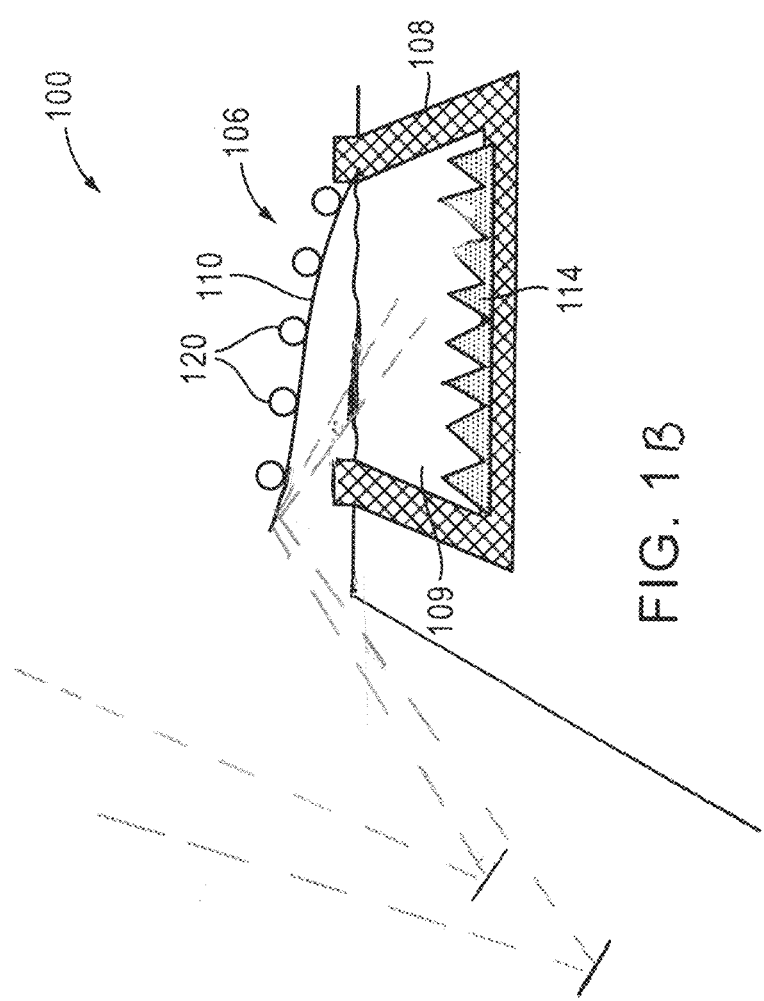
FIG. 1B is a schematic side view of a solar power system including heliostats disposed below a receiver in accordance with some embodiments of the invention.

Referring to FIG. 1B, in an alternative configuration, a receiver container is mounted on top of a solar tower. A cover is disposed above the container. Sunlight is reflected off heliostats disposed at an elevation below the receiver and directed to the underside of the cover, where it is re-directed onto a molten salt pond or other solar absorption material in the container. Similar to the cover described above with respect to FIG. 1A, the cover may be actively or passively cooled so as to allow evaporated salt to condense and form a self-replenishing mirror surface. An annular ledge or drip lip may be provided on the underside of the cover to direct dripping molten salt back into the pond. Further, the uniform and smooth salt layer is highly reflective and can, itself, be used as the mirror, eliminating the need to clean off salt deposits from an underlying mirror surface. A salt-based reflective surface is further advantageous over regular mirrors in that it is not damaged or destroyed even by very high-intensity irradiation. The system may include an underground storage tank, which receives heated salt from the receiver container through a duct. Pumps may lift cold salt from the storage tank to the receiver tank, with hot salt flowing over a weir to a downcomer and back to the storage tank.

2. Solar Energy Receiver

Solar energy receivers in accordance with certain embodiments of the invention may include a container for holding the thermal storage fluid (e.g., molten salt) and a cover disposed above the container, as illustrated schematically in FIG. 1A. A typical container may have a diameter of several tens of meters and a height of several meters; such a container can hold several thousand tons of molten salt, and is suitable for use in a ground-based receiver (as illustrated, e.g., in FIGS. 1A and 3). The container shape may be, e.g., cylindrical, arcuate, or cuboid. The container bottom and side walls may be formed of metal, such as, e.g., iron, chromium, nickel, molybdenum, and manganese. A common type of liquid-salt container has an outer skin made of stainless steel or Inconel, and an interior lining of firebrick. To extract heat from the molten salt, heat exchangers that contact the surface of the container may be used. Alternatively, salt may be pumped to a heat exchanger external to the receiver, where it can be used to generate steam. Molten salt storage systems and methods of extracting heat therefrom for other commercial and industrial process applications are well known to persons of skill in the art.

The cover disposed above the container may likewise be lined with firebrick, and may be connected to the container along the upper edge of at least one container wall. In some preferred embodiments, the cover substantially encloses a space above the container, leaving only a single inlet aperture on one side. In certain embodiments, the aperture has an area of about two square meters. To avoid a loss of evaporated salt and, along with it, energy through the aperture, the receiver may include a door or similar means to temporarily close the aperture (especially during darkness or low solar intensity), or generate an air curtain across the aperture, as discussed in more detail below.

Figure 4:
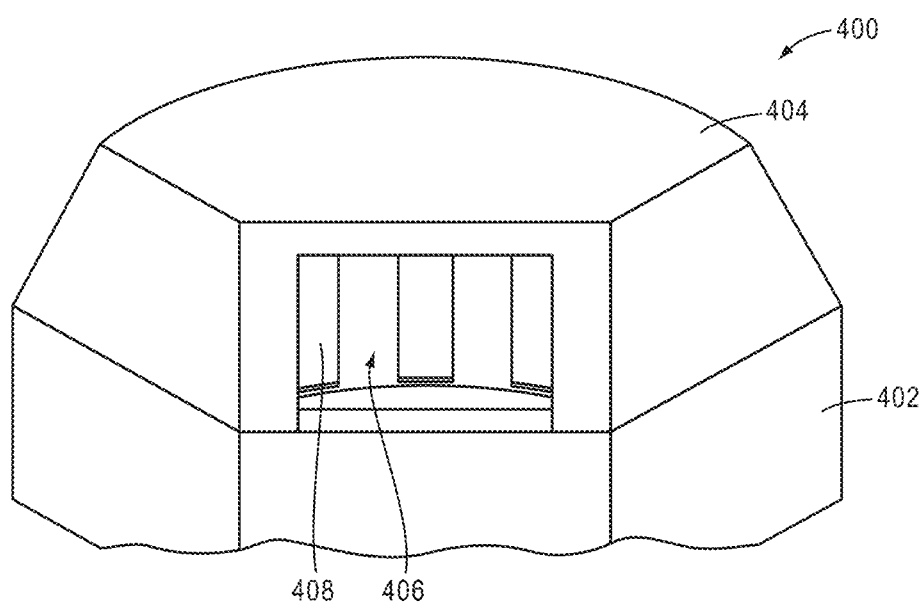
FIG. 4 is a perspective view of a solar energy receiver with a single inlet aperture in accordance with some embodiments.

FIG. 4 shows a frontal three-dimensional view of an exemplary arc-shaped receiver 400 including a salt-filled container 402, a cover 404, an aperture 406, and several heat exchanger windows 408. Such an arcuate receiver can be used, for example, to face a heliostat array covering a 90° angle. On a typical hillside, two such receivers and heliostat arrays may be used.

Due to elevated temperatures of the molten salt, in particular, at the surface of the pond, the salt typically experiences some evaporation, and the vapor will condensate on surfaces whose temperature is below the melting temperature. In various embodiments, the cover is backside-cooled by air or water (using, for example, cooling tubes 120 as illustrated in FIGS. 1A and 1B), and the underside of the cover therefore presents such a condensation surface. (If the underside of the container cover were metallic and held at a temperature higher than the melting point, it would rapidly oxidize and discolor, resulting in decreased reflectivity for the solar light scattered in the receiver.) Because the condensing salt has a much lower conduction coefficient than liquid salt, it may be used as a protective coating. The thermal energy transferred from the hot salt to the cooling fluid may be used to preheat water on its way to a steam generator, or otherwise recovered and fed into the power cycle to increase efficiency.

The salt condensate layer may build up to a steady-state thickness, and may undergo multiple phase changes to form a smooth, solid-liquid-gaseous layer at the cover underside. This layer is highly reflective, and therefore constitutes an indestructible mirror. It may enhance grazing incidence reflection, comparable to the surface of a water body, and thus redirect sunlight from heliostats that does not directly impinge the salt pond. Further, the salt layer on the underside of the cover may redirect radiation scattering off the pond surface back into the pond. To enhance this effect, the cover may be curved, preferably forming a non-imaging concentrator. A curved or inclined shape of the cover further allows molten salt to flow back into and be re-captured by the container.

Figure 5A:
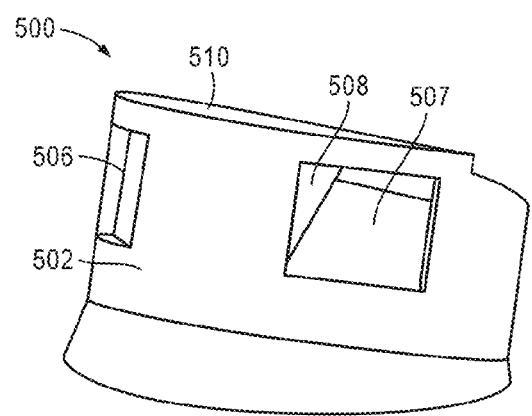
FIGS. 5A and 5B are different perspective views of a solar energy receiver with two inlet apertures in accordance with some embodiments.
Figure 5B:
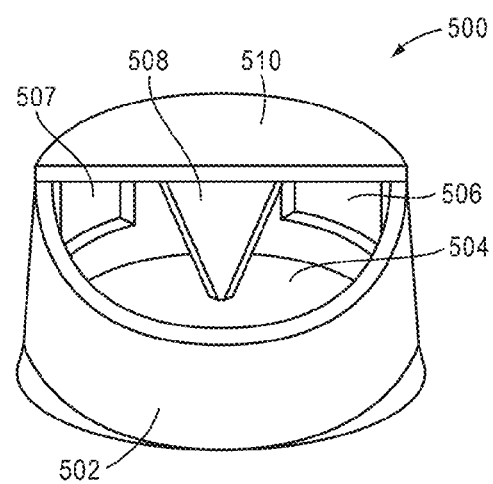

FIGS. 5A and 5B show a three-dimensional side view and a three-dimensional partial-cutaway frontal view, respectively, of another exemplary receiver embodiment. Herein, the receiver 500 includes a large, cylindrically shaped container 502 that creates a cavity 504 for the salt (not shown). Sunlight may be focused from two heliostat arrays through two apertures 506, 507. Typically, each heliostat array forms a 90° degree arc to control the size of the beam due to 0.01 radian divergence of the sunlight rays spreading and intersection of the focused beam through an aperture that cannot be always orthogonal to every beam from each of the heliostats. To prevent sunlight beaming into the receiver through one aperture (e.g., 506) from immediately beaming out of the other aperture (e.g., 507), the receiver includes a reflecting structure 508, which may, for example, be a conically shaped structure suspended from the container cover. In certain embodiments, the reflecting structure 508 has a heat exchanger built into it to cause salt vapor to condense on its surface and thereby to form a protective and reflective coating, similar to the salt-coating on the underside of the cover described above. In some embodiments, the cover 510 (only half of which is shown in FIG. 5B to reveal the inside of the receiver), or a portion of the cover, is removable to facilitate loading the salt and/or maintenance.

FIG. 6A shows a cutaway view of an inclined cylindrical receiver 600, as may be used, for example, in the solar power system depicted in FIG. 2, and FIG. 6B shows a cutaway view of a heat exchanger interface of the inclined cylindrical receiver 600. In this embodiment, sunlight may be concentrated using a concentrating power collector 208, and may be passed through an inlet aperture 602 to impinge on the surface of the molten salt pond 604 inside the container. A portion of the sunlight is refracted into the salt and absorbed through the salt volume, and another portion of the light is reflected off the pond surface and thereafter off the underside of the cover 606, which may be cooled to facilitate salt condensation to provide a protective and reflective coating. In some embodiments, the cover is planar, as shown. In general, the shape of the cover may be optimized based on the laws of diffuse reflective optics, in manners known to those of skill in the art.

The salt pond 604 may be contained by a refractory lining 608 which, in turn, is held by a metal container 610. In some embodiments, a window 612 in the refractory lining enables heat flow to heat exchangers 614, which have inlet/outlets 616 for heating a secondary salt heat transfer loop, as often used in thermal process industries or for direct steam generation. To couple the heat exchangers 614 to the container 610 in a low-stress manner to prevent creep at high temperatures, a liquid metal 618 such as, e.g., antimony, tin, magnesium, aluminum, or a eutectic thereof may be used. Further, to reduce conductive and convective losses, the container 610 may be covered by an insulating layer 620 (akin, e.g., to the insulation used to cover high temperature steam pipes in steam turbine systems). The bottom 622 of the container 610 is preferably also insulated, and in addition structurally adapted to support the weight of the system. Materials and structures that meet these requirements have been widely studied for use in other commercial and industrial applications, and are well known to those of skill in the art.

In various embodiments, the high vapor pressure of high-temperature molten salts may result, in the absence of any mitigation, in significant losses of salt vapor through the inlet aperture. The loss rate depends on the salt temperature and composition as well as on the specifics of the receiver and aperture. For a NaCl/KCl salt mixture at 850° C. and a wind speed at the aperture of 5 m/s, the loss rate has been computed to be about 0.2 kg/m$^2$/h. Such losses of salt are not only costly to replenish, but also reduce the energy efficiency of the system, as the mass transfer across the inlet aperture is associated with a corresponding heat transfer loss. To prevent evaporated salt vapor from escaping the receiver, various embodiments of the invention may include an air curtain across the aperture. The air curtain may be generated by one or more electrically powered blowers built into the cover, or disposed remotely, with associated ducting.

Figure 7:
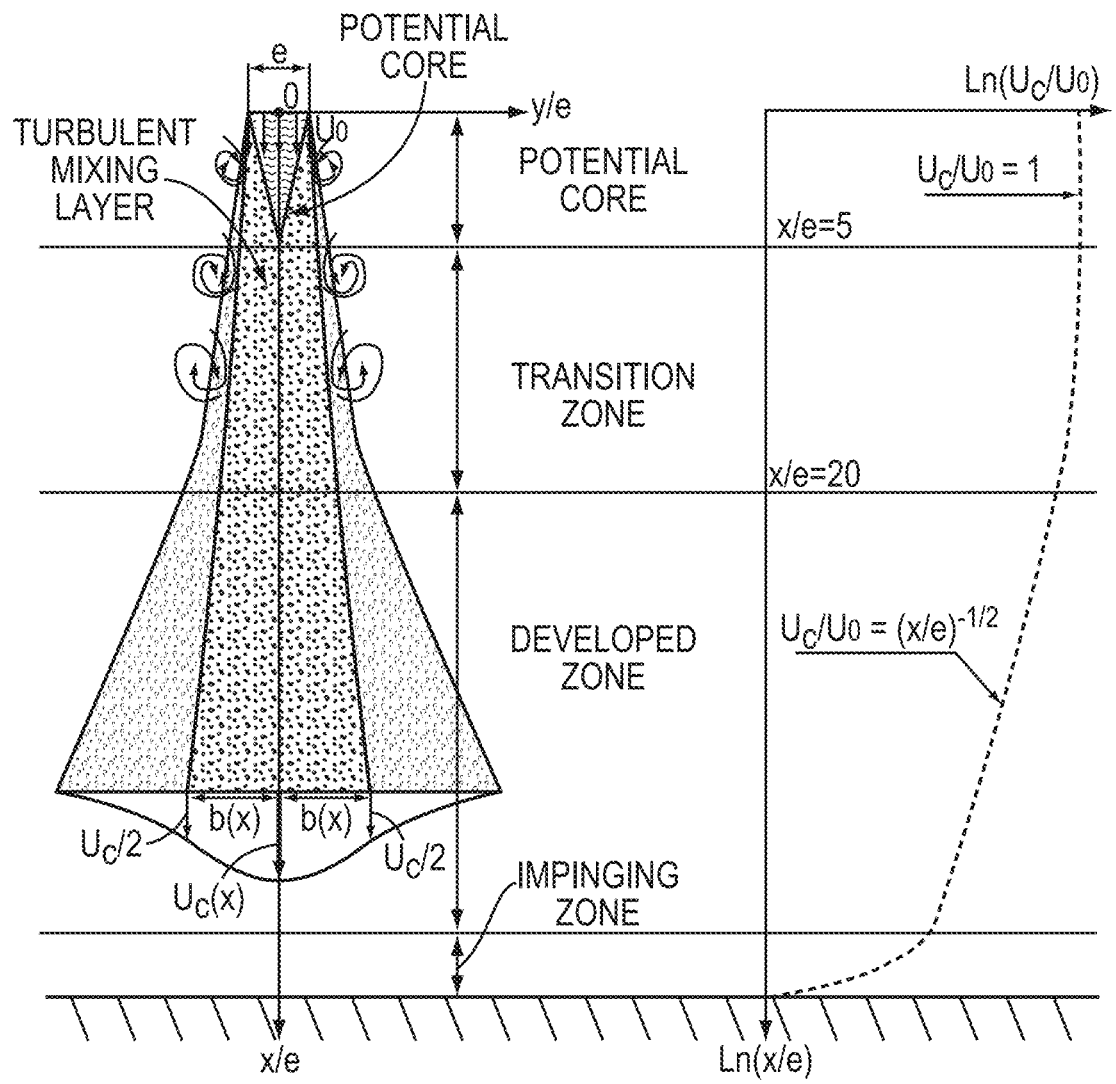
FIG. 7 is a schematic drawing illustrating the velocity distribution of an air curtain in accordance with some embodiments.

FIG. 7 illustrates the velocity profile along the width and length of an air jet having a width e at the blower outlet. Mass flow across the air jet is a function of its width, length, thickness, and outlet velocity. The power requirements of the blowers are likewise dependent on these parameters, which may, accordingly, be selected so as to maximize the efficiency of the air curtain, i.e., the ratio of power saved due to the curtain to the power required by the blowers. In some embodiments, the outlet velocity may be adjustable. Further detail on one type of suitable air curtain and, particularly, the relationship between air jet parameters, environmental parameters, and the power balance of the curtain can be found in Adam Taylor Paxson, "Design and Validation of an Air Window for a Molten Salt Solar Thermal Receiver" (June 2009) (Bachelor of Science thesis, Massachusetts Institute of Technology), which is incorporated by reference herein in its entirety.

Figure 8:
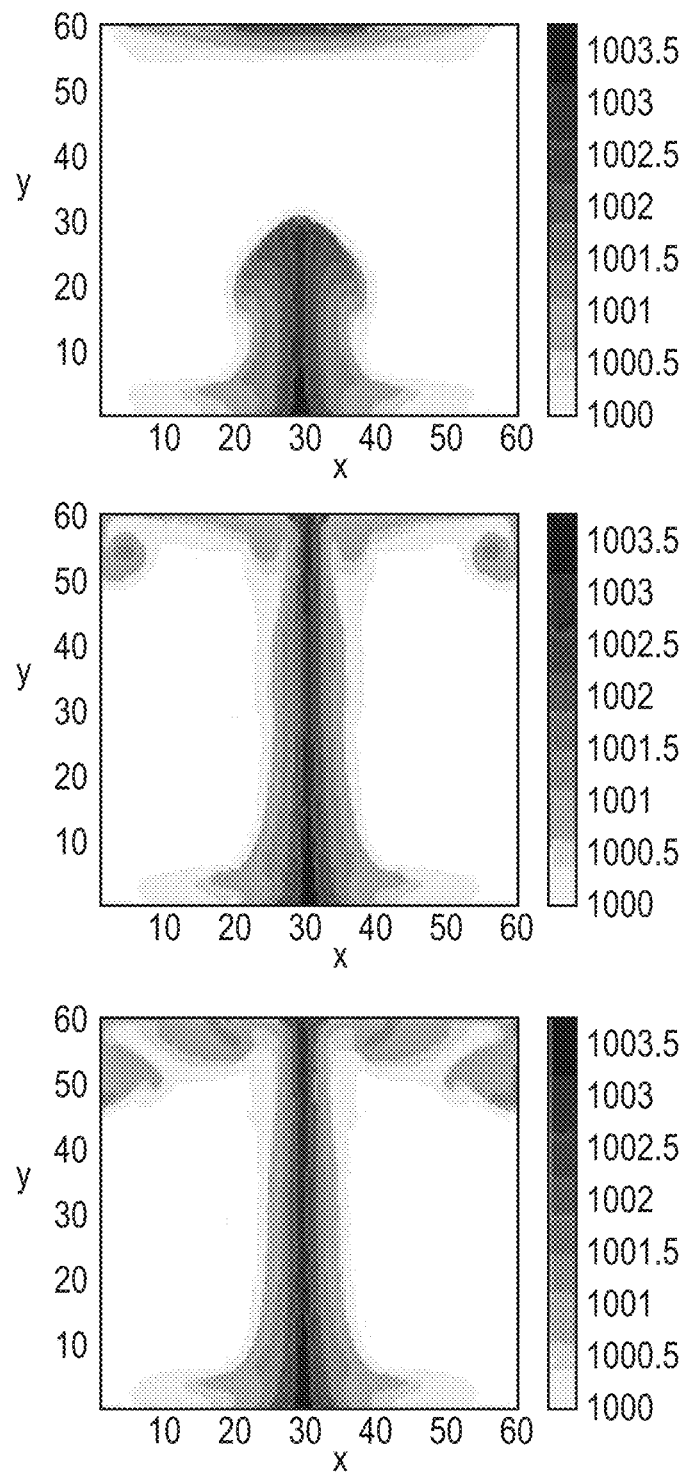
FIG. 8 is a set of computer simulation images illustrating the effect of convection initiator cells in accordance with some embodiments.

In some embodiments, the receiver includes sharply edged, or "spiky" (e.g., conically shaped) convection initiator cells disposed at the bottom or on the walls of the container, as shown in FIGS. 1A and 1B. These convection initiator cells may be formed of molded or broken silicon carbide blocks or other stable materials that are able to withstand the conditions in the molten salt pond. They may act as thermal nucleation sites that initiate and/or enhance convective mixing of the molten salt in the container, and prevent it from thermally stratifying. Thus, they help to minimize hot spots in the salt and prevent the upper surface of the salt pond from overheating and boiling. FIG. 8 shows computer simulation results of the temperature field in a container having convection initiator cells at the bottom.

Figure 9A:
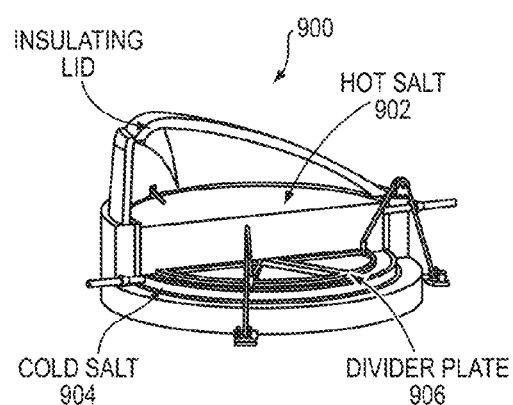
FIGS. 9A and 9B are cutaway perspective views of a divided solar energy receiver with a divider plate in the lower and upper positions, respectively, in accordance with some embodiment.
Figure 9B:
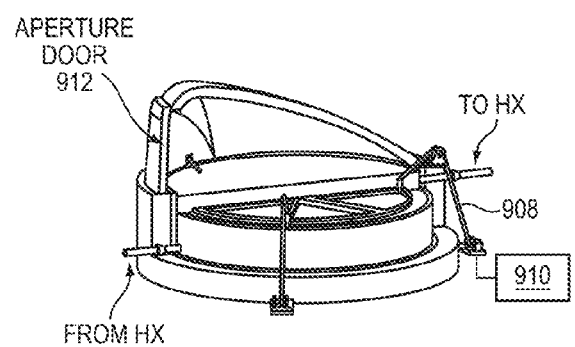

In some embodiments, the receiver container is divided into an upper portion and a lower portion by a (typically horizontally arranged) divider plate. FIGS. 9A and 9B depict an exemplary divided receiver 900 in three-dimensional cutaway views. In operation, heated molten salt is pumped from the upper portion 902 as needed to power a thermodynamic cycle. For example, the hot molten salt may be conducted to an inlet of a heat exchanger, and colder salt exiting the heat exchanger may be pumped back into the lower portion 904 of the receiver container. As a result, the molten salt thermally stratifies, i.e., forms layers of salt with a (usually non-linear) temperature gradient between the top and bottom of the container.

The divider plate 906 that physically separates the upper and lower portions 902, 904 of the container may be thermally insulated, and thus also provide a thermal barrier between the thermally stratified hot and cold layers. In some embodiments, the plate is made of a corrosion- and creep-resistant alloy or of ribbed steel, and is insulated by a firebrick or refractory ceramic layer. While such a plate is heavy, a modest thickness of insulating firebrick may suffice to make it neutrally buoyant in the molten salt. Alternatively, a hollow tubular structure can be used to make the divider plate structure near-neutrally buoyant. The hollow tubes or chambers of this structure may be designed with a slight internal pressure at the operating temperature to minimize stresses in the chamber walls. For example, the divider plate may be constructed from a series of capped pipes or other suitable chambers.

Light entering the receiver may penetrate the molten salt deeply, such that at least a small fraction of it impacts the divider plate 906, causing convection currents and thereby heating the hot salt in the upper portion 904 to a uniform high temperature. The divider plate may be moved axially up and down by actuated cables 908, linkages, or other force-transmission elements, by cylinders, or by any other suitable actuation system components capable of operating in the environment surrounding the receiver 900. An annular gap space (or "radial clearance") between the divider plate 906 and the container walls allows salt to move past the divider plate 906 between the upper and lower portions 902, 904 while the plate 906 is moved. For example, when the divider plate 906 is moved up, molten salt flows from the upper portion 902 through the annular gap space to the lower portion 904. The receiver may include a controller 910 that drives the vertical actuation system so as to move the divider plate at a suitable speed and in the right direction, depending on the momentary operating status and conditions (e.g., the use of the receiver, at the time, as a solar energy receiver or as a source of thermal energy, the intensity of incident solar radiation, the rate of salt pumped through the receiver, etc.). The controller 910 may implement methods for determining the appropriate divider plate movement (as described, for example, below with reference to FIG. 11) in hardware, software, or a combination thereof. For example, the controller 910 may be or include an application-specific electronic circuit, or a general-purpose computer programmed with suitable software.

Figure 10:
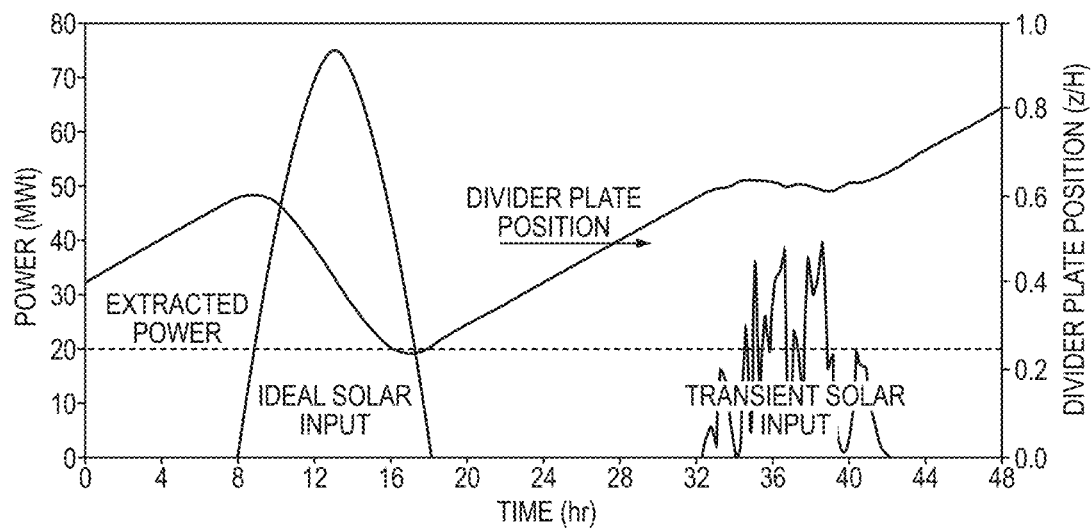
FIG. 10 is a graph illustrating two daily cycles of the solar power input into a divided solar receiver and the corresponding divider plate position, in accordance with some embodiments.

FIGS. 9A and 9B illustrate how the position of the divider plate 906 relates, conceptually, to solar influx and thermal energy extraction from the receiver. As shown in FIG. 9A, at the end of a sunny day, the divider plate 906 has moved down, and the hot side of the receiver is fully charged, i.e., the upper container portion 902 takes up the full interior volume of the container. FIG. 9B depicts the system 900 after a prolonged period of heat extraction without any solar input: the aperture is sealed with an insulated door 912 to reduce losses to the environment, and after a cloudy day and night, the divider plate has moved up, and the cold side 914 is full. FIG. 10 plots the divider plate position over two day/night cycles: one "ideal day" and one mostly cloudy "transient day." As a general rule, when the instantaneous solar input to the receiver 900 is less than the rate of heat extraction, the divider plate is moved up in the tank to maintain the required temperature distribution between the hot and cold volumes; when the solar input is greater then the rate of heat extraction, the divider plate is moved down in the receiver.

The divider plate 906 is typically raised and lowered such that the respective temperatures of the molten salt above and below the divider plate 906 (each temperature being averaged over the respective portion of the container) remain substantially constant or within (usually narrow) specified limits. Stabilizing the temperature of the hot molten salt in the upper portion (while the volume of salt in that portion is varied) enables continuous heat extraction without the need for changes to the thermodynamic process parameters of the power cycle. Temperature variations in the upper and/or lower portions are generally avoided if any net thermal gain to the receiver (resulting from solar energy input and heat extraction from the molten salt) is balanced with (i.e., substantially equals) the heat gain of the molten salt portion that is displaced from the lower to the upper portion, and, conversely, if any net thermal loss to the receiver substantially equals the heat loss of the molten salt portion that is displaced from the upper to the lower portion of the container.

Figure 11:
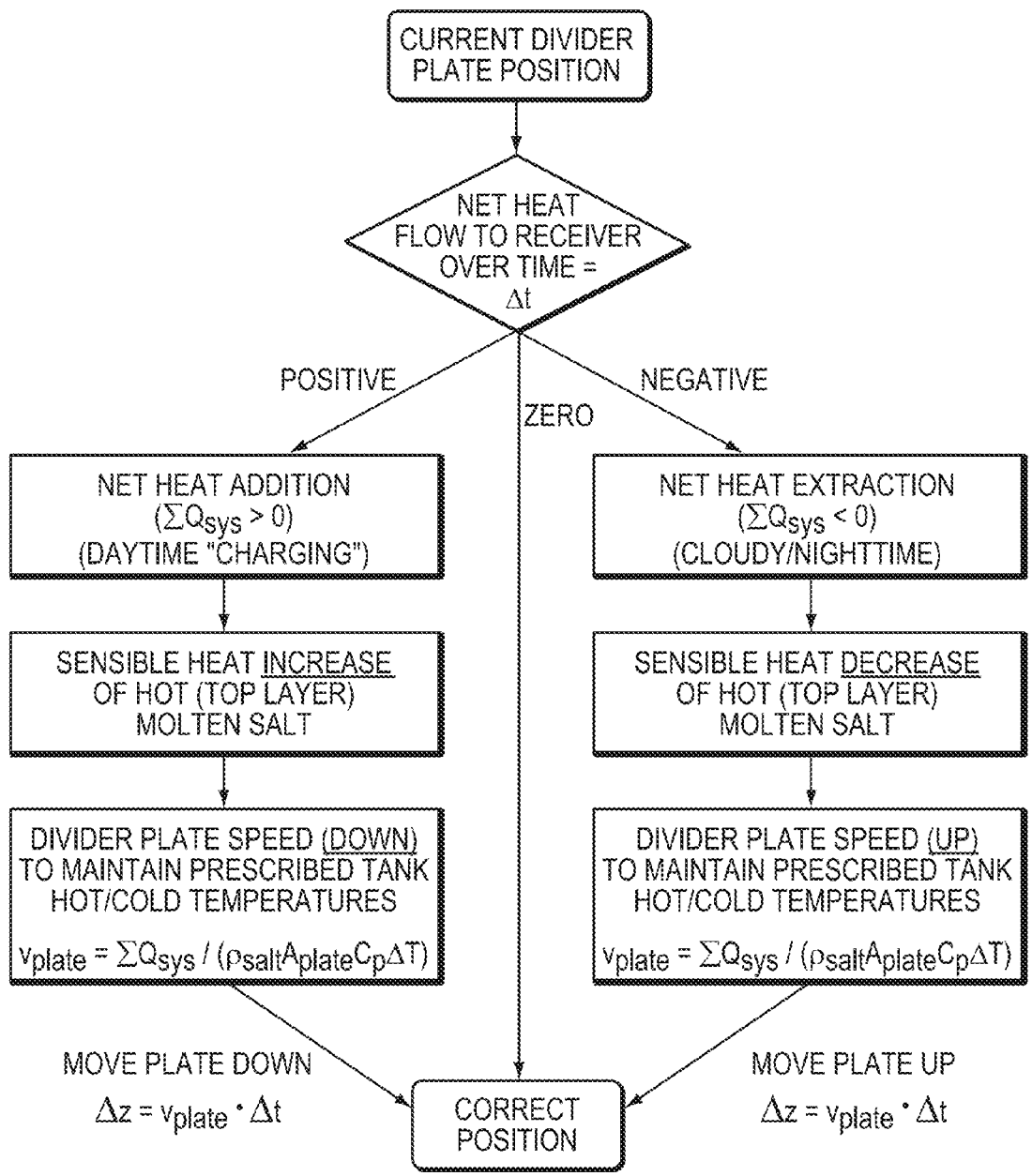
FIG. 11 is a flow chart illustrating a method in accordance with some embodiments for determining the divider position in a divided solar receiver.

FIG. 11 illustrates a control strategy for the vertical position of the divider plate that accomplishes the desired balance between net heat flow into or out of the system and heat transfer to the displaced volume of salt. Assuming that the plate is moved, during a given time interval $\Delta t$, at a constant velocity $v_{plate}$, its position changes by a distance $\Delta z = v_{plate} \Delta t$. The resulting displaced volume of salt is the product of $\Delta z$ and the divider plate area $A_{plate}$. The heat that is required to bring the temperature of the displaced volume from that of the lower container portion to that of the upper container portion, or vice versa, depends on the density $\rho_{salt}$ and specific heat capacity $c_{salt}$ of the salt, and the temperature difference $\Delta T$ between the hot and cold salt: $Q = \rho_{salt} v_{plate} \Delta t \, A_{plate} \, c_{salt} \, \Delta T$.

Denoting the net heat addition to the receiver during time $\Delta t$ by $\Sigma Q_{sys}$, the required plate velocity during that interval is, accordingly:

$$v_{plate} = \Sigma Q_{sys}/(\rho_{salt} \Delta t \, A_{plate} c_{salt} \Delta T)$$

If the net heat flux is positive, the divider plate moves down; if it is negative, the plate moves up.

Divided-container receivers in accordance with various embodiments of the present invention typically define a generous radial clearance between the divider plate and the container walls to facilitate manufacture and to support operational flexibility. The smaller the gap, the larger is generally the velocity of the salt by-flow and, consequently, the flow resistance and drag force on the divider plate. For constant divider plate speeds, the blow-by salt velocity is inversely proportional to the annular gap area. For a cylindrical tank with a radial clearance $\delta_{gap}$ much smaller than the tank diameter $D_{tank}$, the annular gap area can be approximated as:

$$A_{gap} = \pi D_{tank} \delta_{gap}$$

The total volumetric flow of the gap blow-by salt is the sum of the volumetric flow $Q_{HX}$ through the heat exchanger and the volume of salt displaced by the moving divider plate, which acts as a piston:

$$Q_{gap} = Q_{HX} + \pi D_{tank}^2 \cdot v_{plate}$$

The average velocity of the annular salt flow is, thus:

$$v_{gap} = Q_{gap}/A_{gap}$$

An estimate for the drag force on the divider plate can be found according to:

$$F_{drag} = \tfrac{1}{2}\rho_{salt} v_{gap}^2 C_d A_{plate} = \tfrac{1}{2}\rho_{salt} Q_{gap}^2 C_d A_{plate}/A_{gap}^2$$

Herein, $C_d$ is a geometry-dependent drag coefficient. For a circular, flat plate perpendicular to the fluid flow, the drag coefficient $C_d$ is 1.12. As can be seen from this final equation, the drag force increases with the inverse of the square of the gap area, i.e., the smaller the gap area, the larger is the drag force. A larger drag force on the divider plate, in turn, requires larger positioning actuators, which increases the cost of the system. In addition, a very small gap may render the receiver prone to salt freezing, or another form of mechanical binding, between the divider plate and container walls, which would immobilize the system. On the other hand, a generous radial clearance between the divider plate and the container walls results in very low flow velocities. This creeping flow of low-viscosity molten salt past the slowly moving plate typically renders the drag force on the plate negligible.

Figure 12:
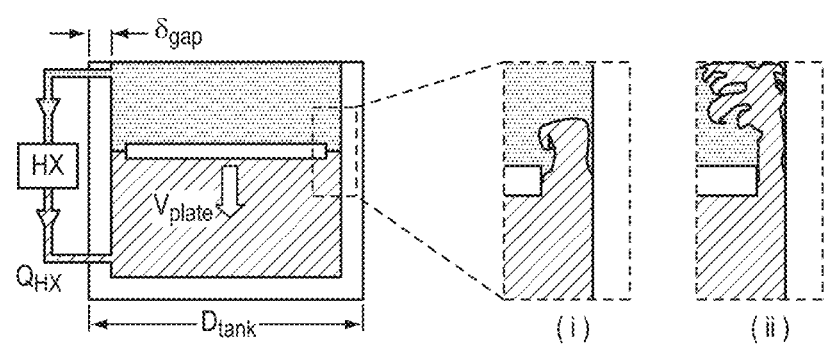
FIG. 12 is a side view of a divided salt-filled solar energy receiver container, contrasting molten-salt plumes for different radial clearances between the divider plate and the walls of the container.

In addition to its impact on receiver cost and operational robustness, the annular gap generally has a significant effect on system performance. As depicted in FIG. 12, different gap clearances result in different flow and mixing patterns. Inset (i) of FIG. 12 illustrates a wide clearance, which results in slow velocities past the divider plate, and weak laminar plumes of unmixed cold salt. Inset (ii) of FIG. 12, on the other hand, depicts a comparatively smaller clearance, which achieves uniform temperatures in the upper portion of the container by ensuring a well-mixed plume of cold salt: cold salt has enough momentum to penetrate far into the hot salt region, and the laminar-turbulent transitionary or fully turbulent nature of the plume promotes good mixing with the hot salt volume. The turbulences and mixing resulting from the "injection" of cold salt upwards into lower-density hot salt for various gap clearances, divider plate speeds, and salt properties (e.g., composition and temperature) may readily be modeled and characterized, by methods generally known to persons of skill in the art. Moreover, probable plume geometry, fluid entrainment mixing, and plume spreading angles can be inferred from published previous work on buoyancy-driven laminar thermal plumes and turbulent thermal and jet plumes. See, e.g., Moses et al., "An experimental study of laminar plumes," J. Fluid Mech., vol., 251, pp. 581-601 (1993), and Pera et al., "Laminar plume interactions," J. Fluid Mech., vol. 68, part 2, pp. 259-271 (1975), which are hereby incorporated herein by reference.

Figure 13:
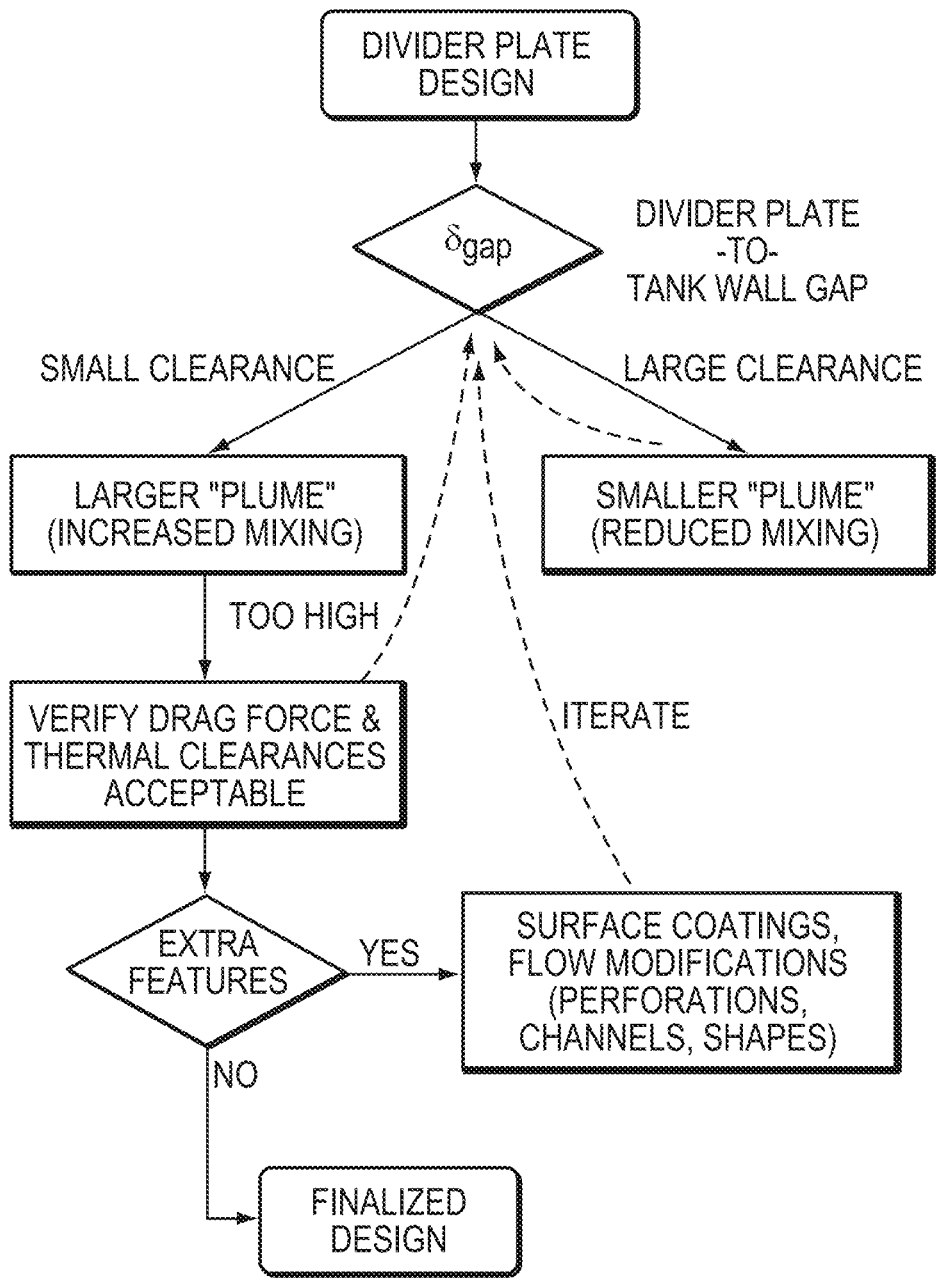
FIG. 13 is a flow chart illustrating a method in accordance with some embodiments for designing a divider plate for a divided solar energy receiver.

FIG. 13 illustrates, in a flow chart, a design process for a thermal receiver divider plate. The process involves determining a gap size that results in a desired level of mixing, and then computing the drag force and thermal clearance for the selected gap over the operating temperature range of the system. If the drag force is unacceptably high, the radial clearance is reduced. This process is repeated iteratively until an acceptable trade-off between high mixing and low drag forces has been found. Optionally, the plate design is then refined with surface coatings or flow-modifying topographical structures, such as perforations, channels, or other shapes. Following these adjustments, the radial clearance is fine-tuned to, again, achieve both sufficient mixing and tolerable drag forces.

The divider plate may be modified in various ways. For example, the thermal and physical separation of the flat, concentric-disc divider plate geometry may be changed with, for example, bypass holes or perforations of appropriate size. Similarly, bypass grooves or regularly spaced channels may be scalloped into the side of the divider plate, creating areas of differential flow which cause plume instabilities and promote mixing. Further, the bottom surface of the plate can be made non-planar; for examples, convex or concave profiles with grooves and channels can be used to direct flow to desired regions. Moreover, in some embodiments, the upper surface of the divider plate is textured, coated, and/or oxidized to enhance solar absorptivity and reduce specular reflectivity. Various combinations and permutations of these configurations may be employed to achieve particular results.

3. Molten Salt Compositions

Salt compositions contemplated for use in various embodiments include mono, binary, and ternary compositions of three classes of salts: chlorides, carbonates, and fluorides. An example of a suitable binary chloride salt is a eutectic mixture of 50 mol % NaCl and 50 mol % KCl, which has a melting point of 657° C. and operating range up to 1100° C. A suitable ternary carbonate salt is, for example, a mixture of 32 wt. % $Li_2CO_3$, 33 wt. % $Na_2CO_3$, and 35 wt. % $K_2CO_3$, which has a melting point of 432° C. and an operating range of up to 950° C. The traditional nitrate/nitrate salts, such as a mixture with 53 wt. % $KNO_3$, 40 wt. % $NaNO_2$, and 7 wt. % $NaNO_3$, are typically not suitable candidates because they decompose as the temperature approaches 600° C.

The preferred classes of salts satisfy several key requirements: they all have a broad range of operating temperatures, are semi-transparent over the range of wavelengths relevant to the solar spectrum, and are chemically compatible with the surrounding materials (i.e., the container walls and cover) and with air at temperatures up to at least 1000° C. Further, they are relatively inexpensive and have low toxicity. Various thermo-physical and optical properties of exemplary salts in accordance with certain embodiments and, for comparison, the traditional nitrate-nitrite salt, are listed in TABLE 1.

TABLE 1

|  | NaCl—KCl | Li$_2$CO$_3$—Na$_2$CO$_3$—K$_2$CO$_3$ | KNO$_3$—NaNO$_2$—NaNO$_3$ |
|---|---|---|---|
| Density* | 1520 kg/m$^3$ | 1900 kg/m$^3$ | 1850 kg/m$^3$ |
| Viscosity* | 1.2 mPa·s | 4.3 mPa·s | 2.4 mPa·s |
| Thermal conductivity* | 0.45 W/m-K | 0.82 W/m-K | 0.61 W/m-K |
| Specific heat* | 1090 J/kg-K | 1560 J/kg-K | 1560 J/kg-K |
| Light attenuation coefficient (average over visible range) | 0.035 cm$^{-1}$ |  | <0.01 cm$^{-1}$ |

(*At 800° C. for NaCl—KCl and Li$_2$CO$_3$—Na$_2$CO$_3$—K$_2$CO$_3$; at 350° C. for KNO$_3$—NaNO$_2$—NaNO$_3$)

The chloride salts at high temperatures can react with moisture to produce small quantities of HCl. This effect may be minimized by the addition of small quantities of hydroxides, such as NaOH, to the molten salt.

In various embodiments, the selection of a salt for use in the receiver is based on the operating parameters of the solar power system. Preferably, the molten salt has a low melting temperature and a high degradation temperature above the maximum steam temperature to be generated. Where the hot salt is pumped to a steam generator and then returned "cold," the total energy that can be stored is a function of the "hot" and "cold" salt temperatures and the mass and specific heat of the salt. If the steam is generated from coils in contact with the container of molten salt, the energy stored will be a function of the ability of the salt to stratify in the tank, such that cold salt sinks to the bottom, where water enters the coils, and the hot salt stays at the top where steam exits the coils.

In general, high temperature salts, such as chloride salts, have a melting temperature close to that of the steam temperature so energy stored depends on heating the salts to temperature hundreds of degrees hotter than the steam temperature. For many hours or even days of storage, the difference of the "hot" salt temperature between the end of the day and the temperature at the time the sun starts to reheat the salt is ideally very high, on the order of 300° C. to 400° C., such that the required volume of salt is minimized. Further, the salt desirably does not degrade when used in an open air environment, as the use of a solid window to separate the salt from the air would degrade with time and increase system costs.

In one embodiment, the salt mixture includes sodium chloride and potassium chloride in a 1:1 ratio (by mass). This inexpensive mixture has a eutectic melting point of about 670° C. and a boiling point around 1400° C.; hence, it is ideal for generating superheated steam. Moreover, it is extremely robust: unlike nitrate salts, which can decompose if overheated, or boiler tubes that can burn through, rupture or fatigue, it essentially cannot be damaged. Further, because the NaCl/KCl salt mixture is relatively transparent, it will create convective mixing as the solar flux increases, thereby causing the system to self-stabilize, i.e., to achieve a fairly uniform temperature distribution and avoid local overheating.

In certain embodiments, the salt composition further includes nanoparticles that improve the thermal capacity and conductivity of the composition, and increase the solar light attenuation coefficient, thereby facilitating absorption of solar energy throughout the whole volume of the pond. For example, it may be desirable to adjust the nanoparticle concentration in the pond so that solar energy is absorbed primarily below the surface of the pond, rather than at the receiver walls or bottom. By adjusting the concentration of particles, the optimal bulk absorption profile may be readily achieved. By employing the air curtain discussed above, contamination of the pond, with airborne dust or dirt, and associated changes to the energy absorption profile can be delayed or reduced.

The nanoparticles may be manufactured from oxide materials (such as, e.g., alumina, silica, zirconia, titania, and their compounds), metals (such as, e.g., gold, silver, platinum, copper, aluminum, and their alloys), and/or other refractory materials (such as, e.g., graphite or diamond). They may be slender nanorods, nanodisks, or nanotubes, or may have spherical, oblate, or prolate shape. Preferably, at least one characteristic dimension of the particles is in the range from 1 to 1000 nm. The addition of nanoparticles may increase the viscosity and decrease the thermal expansion coefficient of the composition, which may hinder natural circulation and mixing within the pond. Further, they may increase the density, which poses higher-weight support requirements on system components, such as pumps. To limit these effects, the particle concentration may be limited, e.g., to below 5% vol., or below 3% vol., or below 1% vol.

The selection of particles to be used in the salt composition generally depends on specific system requirements and may constitute a trade-off between various considerations. Oxide- and carbon-based particles may bear the advantage, compared with metal-based particles, of being chemically more inert, and thus more compatible with the molten salts. On the other hand, metallic and diamond particles may be desirable for the greater enhancement of thermal conductivity. Within the metallic particle class, the noble metals typically have higher chemical stability than aluminum and copper, but are also associated with higher cost. Particles with high aspect ratios can provide higher thermal conductivity enhancement, but also may exhibit higher viscosity. Smaller particles can be advantageous in that their dispersions are more easily stabilized than those of larger particles.

4. Thermal Energy Storage and Conversion into Mechanical or Electrical Energy In various embodiments, the receiver utilizes a molten salt composition (including, e.g., carbonates and/or chlorides) capable of withstanding temperatures exceeding 700° C., preferably exceeding 1000° C., without decomposing. Such a high-temperature composition facilitates high-density solar-to-thermal energy conversion. Further, it enables high-density thermal energy storage: the heat capacity of the molten salt between the peak receiver temperature and the power cycle temperature (which may, e.g., be 600° C.) is used to store energy for the power cycle when the sun does not shine. For these reasons, high-temperature molten salt compositions can increase overall system efficiency.

Figure 14:
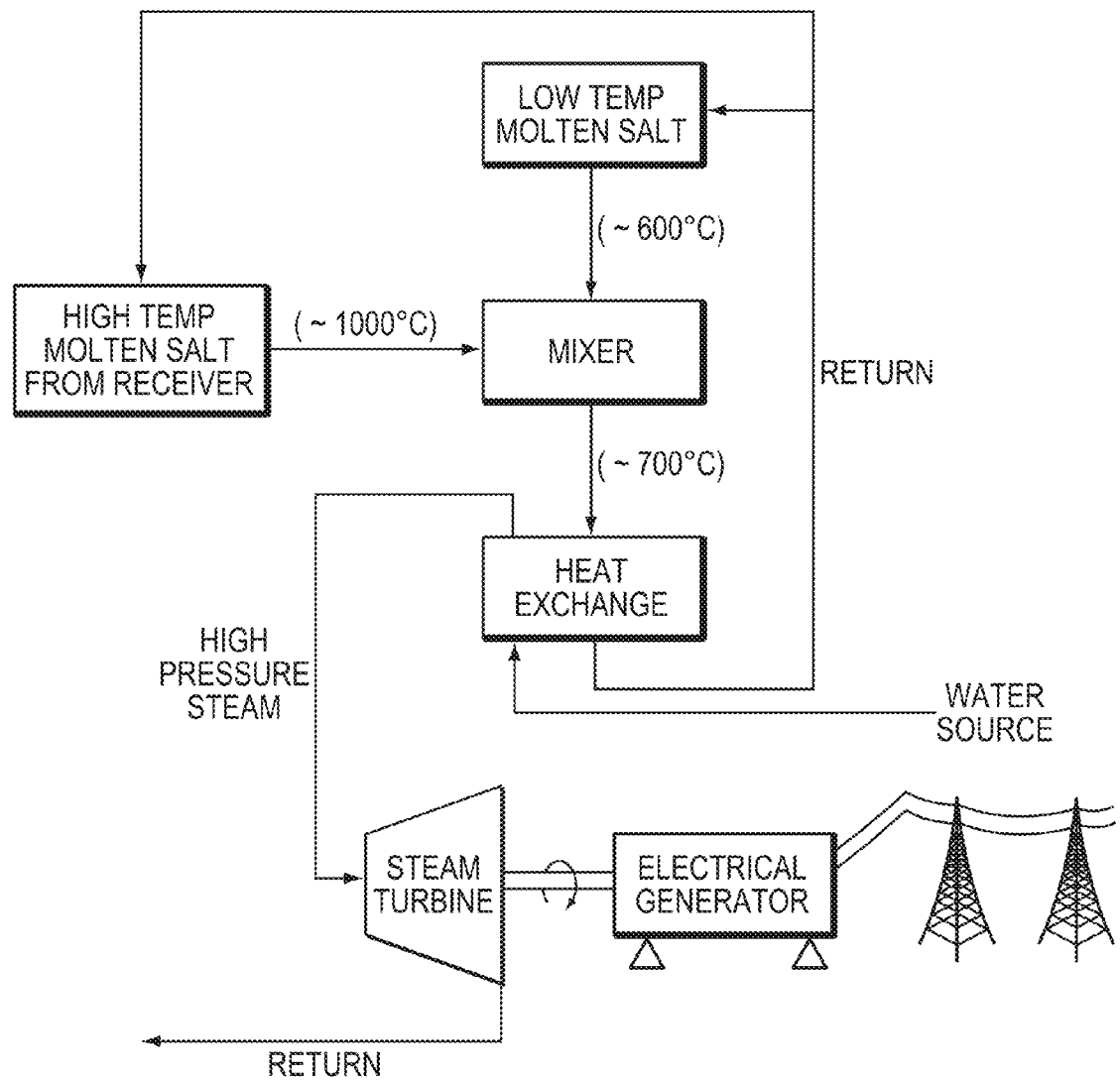
FIG. 14 is a block diagram illustrating a thermal energy storage, transfer, and power generation system in accordance with some embodiments.

However, at temperatures of the thermal storage medium above 700° C., many materials and systems conventionally employed for generating steam would be damaged or destroyed and, thus, cannot be used. This limitation of conventional heat transfer systems may be overcome by modifications as shown in FIG. 14. In the illustrated embodiment, hot molten salt from the solar receiver is conducted over a short distance, through ducting made of ceramics, carbon composites, silicon carbide, or other high temperature materials, into a mixer without moving parts, where it is mixed with a colder medium of the same composition. As a result, the temperature of the mixture is reduced. For example, hot salt having a first temperature of 1000° C. may be mixed with colder salt having a second temperature of 600° C. at a ratio of 1:3, resulting in molten salt having a third temperature of 700° C. The mixture may then pass through a heat exchanger, where it transfers some of its thermal energy to water in a secondary thermal cycle, for example, a steam cycle that converts heat into rotational energy of a steam turbine and, ultimately, into electricity. The temperature of the mixture is further decreased in the heat exchanger. After leaving the heat exchanger, the molten salt may be split into a first stream used to replenish the solar energy receiver, and a second stream that is recycled into a storage tank holding the colder molten salt at the second temperature.

In some embodiments, the power cycle is a direct-air Brayton cycle, which may be implemented with technology that is commercially available, for example, from various turbine vendors. In contrast to conventional water-cooled cycles, a direct-air cycle releases warm exhaust air directly into the atmosphere. Such dry cooling presents a significant advantage to solar power systems, which are often located in hot and dry regions (such as deserts), where water supplies are very limited.

With high-temperature salts (e.g., salts facilitating operating temperatures of about or exceeding 700° C.), a direct-air Brayton cycle may be used, eliminating the need for cooling water to provide a low-temperature heat sink for the power cycle. With a salt inlet temperature to the power cycle of about 704° C. and an exit temperature of about 600° C., the cycle efficiency is approximately 40%—a significantly higher efficiency than conventional dry-cooled power cycles, which operate within lower temperature ranges, afford. However, the cycle efficiency is strongly dependent upon the temperature range over which the heat is delivered to the power cycle, and fairly inefficient at the lower temperatures of traditional solar power towers. For example, at 500° C. peak molten salt temperature, the efficiency is only 32%. On the other hand, if cooling water is available, a closed Brayton power cycle (e.g., a supercritical carbon dioxide cycle) may be used, resulting in an efficiency of about 43-44% with a peak carbon dioxide temperature of 550° C. and an efficiency of 47-48% with a peak carbon dioxide temperature of about 650° C. The corresponding molten salt temperature would be 10-20° C. higher. This illustrates that solar power systems using high-temperature molten salts may be decoupled from dependency on water cooling for a relatively small sacrifice of efficiency.

5. Examples

Example 1

Solar Concentrator and Thermal Energy Storage System

TABLES 2-5 provide system design parameters for one embodiment of a solar power system in accordance with the invention, which includes hillside-mounted heliostats and a ground-based receiver using a 50 wt. % NaCl/50 wt. % KCl mixture. The system can achieve a continuous ("24/7") MW electrical power output. It requires a total land area of about 72 acres for the heliostat field and receiver. Several such systems may be located next to each other, and their thermal outputs may be combined via high-temperature, high-pressure steam piping to feed a central steam turbine and generator set. Methods of collecting thermal energy from different receivers, and bringing it to a central steam plant, are well known in the art.

TABLE 2 lists dimensional and optical design parameters and various performance characteristics of the solar power system. Herein, the calculations of the performance parameters based on the design parameters account for the spacing of the heliostats to avoid shading and blocking, and the cosine effect of the sun with respect to the heliostats on the hill and the required heliostat inclination to direct the sunlight into the receiver aperture. These types of geometric and optical calculations are well known to those skilled in the art.

TABLE 2

| | |
|---|---|
| Minimum distance of heliostats from base of hill (m) | 20 |
| Maximum distance of heliostats from base of hill (m) | 400 |
| Maximum distance of heliostats from receiver aperture (m) | 575 |
| Total projected heliostat area per segment ($m^2$) | 55,728 |
| Optical efficiency | 90% |
| Angle of the sun above the horizon (°) | 80 |
| Distance of receiver from base of hill (m) | 200 |
| Hill angle (°) | 35 |
| Angle spanned by heliostat arc (°) | 90 |
| Number of heliostat arc segments | 2 |
| Azimuthal heliostat packing density | 0.7 |
| Number of heliostat rows | 89 |
| Effective land coverage factor | 21.1% |
| Land area of hillside heliostat arc (hectares) | 29 |
| 24/7/365 average insolation ($W/m^2$) | 200 |
| 24/7/365 average available thermal power (kW) | 11,146 |
| Net overall solar to electric power efficiency | 29% |
| Mass of salt required for 24/7 operation (metric tons) | 5,457 |
| Net average 24/7 electric power generated (MW) | 4.95 |
| Mass of salt required per kWeh (metric tons) | 45.9 |

TABLE 3 summarizes the land (in particular, hillside land) requirements for the system. As can be seen, the hillside area required to generate a significant fraction of the power needs of the South-Western U.S. states is relatively modest, given the vast tracts of available federal land, much of which is hilly.

TABLE 3

| | |
|---|---|
| Net 24/7 electric power ($We/m^2$) | 20 |
| Total desired power (GW) | 500 |
| Total area required ($km^2$) | 25,000 |
| Distance upwards on hillside (m) | 500 |
| Slope of hill (°) | 35 |
| Number of heliostat arc segments | 2 |
| Total elevation (m) | 574 |
| Linear distance of hillside required (km) | 25,000 |
| Width of strip of land for one system (km) | 100 |
| Number of strips of land | 250 |

TABLE 4 lists typical thermal operating parameters for the system. The salt depth is kept less than 4 m because the sunlight may not penetrate deeper than that in a salt such as 50% NaCl/KCl. If other, clearer salts compatible with the similarly high temperature and incident-power levels are available, a deeper salt pond with smaller diameter may be used, potentially resulting in higher thermal efficiency. Since only sensible heat is used as the storage method, and the product of density and specific heat for low-cost bulk materials is within a relatively narrow range, the size of the thermal storage system is significant, and, accordingly, a high differential temperature (i.e., difference between the maximum and minimum temperatures of the thermal storage medium) is needed.

TABLE 4

System temperatures

| | |
|---|---|
| Maximum temperature of thermal storage medium (° C.) | 900 |
| Minimum temperature of thermal storage medium (° C.) | 650 |
| Ambient temperature (° C.) | 20 |

Cylindrical storage container

| | |
|---|---|
| Desired storage period (h) | 24 |
| Container height (m) | 3.2 |
| Total volume required (m³) | 3,583 |
| Container diameter (m) | 38 |

Storage potential of 50% NaCl/KCl

| | |
|---|---|
| Density of thermal storage medium (kg/m³) | 1,523 |
| Specific heat capacity of thermal storage medium (J/kg K) | 1,089 |
| Total mass of thermal storage medium (metric tons) | 5,457 |
| Energy stored (J) | $1.49 \cdot 10^{12}$ |
| 24/7 average stored thermal power available (W) | 17,195,776 |

TABLE 5 shows the design parameters of a heat exchanger plate that may, in some embodiments, be attached to the wall of the cylindrical tank that contains the salt. The table shows that the "windows" on the pond—regions on the steel container where the interior fire brick lining is thinner, or even left off, so that the heat exchangers can be attached to reduce the thermal path length—are of a number commensurate with the size of the pond for the power desired. In other words, the system proportions are good and the design is feasible.

TABLE 5

| | |
|---|---|
| Thermal power required by steam system (MWt) | 17 |
| Width (m) | 2.5 |
| Height (m) | 4 |
| HX Wall thickness (m) | 0.04 |
| HX plate effective thermal conductivity k (W/m-K) | 17 |
| Temperature drop across HX plate (K) | 100 |
| Power extracted per window (W) | 425,000 |

TABLE 5-continued

| | |
|---|---|
| Number of windows needed | 40 |
| Inner container diameter (m) | 40 |
| HX pitch spacing/HX width | 1.3 |
| Number of heat exchanger units that can be accommodated | 40 |

Example 2

Divided Thermal Receiver

TABLE 6 provides, system design parameters for one embodiment of a solar power system with a divided tank (as illustrated, for example, in FIGS. 9A and 9B). The system achieves 4 MW electrical power output and 40 hours thermal storage. The divider plate is "ribbed" for structural reinforcement. It can easily be made near-neutrally buoyant by the addition of insulating refractory material to one or both sides, or by construction from capped metal tubes.

TABLE 6

| | Salt type | |
|---|---|---|
| | 60-40 Na, KNO3 | 50-50 Na, KCl |
| Density of the thermal storage medium (kg/m³) | 1796 | 1523 |
| Specific heat capacity of the thermal storage medium (J/kg-K) | 1607 | 1089 |
| System temperatures | | |
| Maximum temperature of the storage medium (° C.) | 550 | 950 |
| Minimum temperature of the storage medium (° C.) | 250 | 650 |
| Cylindrical container | | |
| Total volume required (m³) | 3071 | 5345 |
| Container height (m) | 5.0 | 4.0 |
| Container diameter (m) | 28.0 | 41.2 |
| Divider Plate System | | |
| Radial clearance between divider plate and container walls (mm) | 200 | 200 |
| Effective thickness of divider plate (mm) | 12.7 | 12.7 |
| Mass multiplier to account for ribbing | 1.5 | 1.5 |
| Divider plate steel density (kg/m³) | 7800 | 7800 |
| Divider plate insulation density: Zircal-45 Calcium Silicate (kg/m³) | 760 | 760 |
| Thickness of divider plate insulation (mm) | 110 | 156 |
| Mass flow of salt for power extraction (kg/s) | 37.4 | 55.2 |
| Upward divider plate velocity during darkness (mm/s) | 0.034 | 0.027 |
| Normal nighttime divider plate distance traveled upward (m) | 2.07 | 1.66 |
| Maximum cloudy-day divider plate distance traveled up (m) | 5.00 | 4.00 |
| Normal daytime divider plate velocity down (mm/s) | 0.082 | 0.066 |
| Daytime salt velocity (blow-by): plate-container annulus (mm/s) | 4.09 | 4.81 |
| Drag force on divider plate during daytime move ($C_d = 1.12$) (N) | 10.0 | 25.9 |
| Apparent mass of divider plate (kg) | 248.4 | 719.2 |

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A concentrated solar power system comprising:
   a ground-based solar energy receiver comprising an insulated container adapted to contain an at least semi-transparent solar absorption material comprising molten salt in a pond form for receiving and converting solar energy into heat;
   a plurality of heliostats configured so as to reflect impinging solar radiation directly, without further reflections into an open unsealed aperture formed along a side of the receiver to impinge on an exposed horizontal surface of and penetrate into the solar absorption material in the pond to absorb solar radiation and store the absorbed solar radiation as thermal energy; and at least one of (i) a blower for generating an air curtain across the open unsealed aperture formed along the side of the receiver to prevent salt vapor from escaping the receiver and (ii) a door to seal the aperture formed along the side of the receiver to reduce thermal energy loss from the receiver and to prevent salt vapor from escaping the receiver through the open unsealed aperture, wherein salt vapor may escape through the open unsealed aperture and the at least one of the blower and the door prevents such escape.

2. The system of claim 1, further comprising the solar absorption material, and wherein the solar absorption material comprises a phase change material comprising molten salt.

3. The system of claim 2, wherein the phase-change material is semi-transparent.

4. The system of claim 2, wherein the molten salt is selected from the group consisting of chloride salts, fluoride salts, carbonate salts, nitrite salts, and mixtures thereof.

5. The system of claim 4, wherein the molten salt is chloride salts and the phase change material further comprises hydroxide for reducing generation of HCl when the molten salt comes into contact with moist air.

6. The system of claim 1, wherein the solar absorption material comprises a nanoparticle blend, to modify a solar radiation absorption characteristic thereof.

7. The system of claim 1, wherein the heliostats are located at an elevation above the aperture of the receiver, and oriented so that solar radiation passing through the aperture is directed primarily at a surface of the solar absorption material.

8. The system of claim 7, wherein the heliostats are mounted on a hillside.

9. The system of claim 1, wherein the receiver is buried in the ground.

10. The system of claim 1, wherein the receiver comprises a container and a cover disposed thereover.

11. The system of claim 10, wherein additional heliostats are disposed at an elevation below the receiver, and oriented so that solar radiation passing through the aperture is directed at an underside of the cover and adapted to be reflected into the at least semi-transparent solar absorption material in the pond.

12. The system of claim 1, wherein the ground-based receiver and heliostats together are configured to facilitate heating of the solar absorption material to a temperature of at least about 600° C.

13. A method of generating energy using a concentrated solar power system comprising (i) a ground-based solar energy receiver comprising an insulated container adapted to contain an at least semi-transparent solar absorption material comprising molten salt in a pond form for receiving and converting solar energy into heat; (ii) a plurality of heliostats configured so as to reflect impinging solar radiation directly, without further reflections, into an open unsealed aperture formed along a side of the receiver to impinge on an exposed horizontal surface of and penetrate into the solar absorption material in the pond; and (iii) at least one of a blower for generating an air curtain across the aperture formed along the side of the receiver to prevent salt vapor from escaping the receiver, and a door to seal the aperture formed along the side of the receiver to reduce thermal energy loss from the receiver and to prevent salt vapor from escaping the receiver through the open unsealed aperture, wherein salt vapor may escape through the open unsealed aperture and the at least one of the blower and the door prevents such escape, the method comprising the steps of:

directing solar radiation from the plurality of heliostats in a single reflection from each of the heliostats into a solar energy receiver through an aperture thereof so as to concentrate solar energy in the receiver, thereby heating a solar absorption material contained in the receiver to a temperature of at least about 600° C.;

transferring thermal energy from the heated solar absorption material to a working fluid; and generating at least one of mechanical energy and electrical energy using the working fluid.

14. The method of claim 13, wherein thermal energy is transferred to the working fluid at a temperature exceeding about 700° C.

15. The method of claim 14, wherein the working fluid comprises air, and the energy generation step utilizes a direct air Brayton power cycle.

16. The method of claim 15, wherein the Brayton power cycle does not require water cooling.

17. The method of claim 13, wherein the thermal energy is transferred from the heated solar absorption material to the working fluid in a heat exchanger.

18. The method of claim 17, further comprising mixing liquefied solar absorption material from the receiver with cooler solar absorption material from an outlet of the heat exchanger so as to decrease a temperature of the liquefied solar absorption material prior to delivery to the heat exchanger.

19. The system of claim 1, wherein the receiver is disposed on the ground.

20. The system of claim 1, wherein the door is insulated.

* * * * *